(12) United States Patent
Islam et al.

(10) Patent No.: US 11,115,257 B2
(45) Date of Patent: Sep. 7, 2021

(54) SYSTEM AND METHOD FOR MULTIPLEXING TRAFFIC

(71) Applicant: Huawei Technologies Co., Ltd., Shenzhen (CN)

(72) Inventors: Toufiqul Islam, Ottawa (CA); Jiayin Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/919,867

(22) Filed: Mar. 13, 2018

(65) Prior Publication Data

US 2018/0278454 A1    Sep. 27, 2018

Related U.S. Application Data

(60) Provisional application No. 62/475,762, filed on Mar. 23, 2017.

(51) Int. Cl.
*H04L 27/26* (2006.01)
*H04L 1/18* (2006.01)
(Continued)

(52) U.S. Cl.
CPC ........ *H04L 27/2655* (2013.01); *H04L 1/0038* (2013.01); *H04L 1/1819* (2013.01);
(Continued)

(58) Field of Classification Search
None
See application file for complete search history.

(56) References Cited

U.S. PATENT DOCUMENTS 10,455,504 B2     10/2019  Li et al.
2016/0174259 A1*   6/2016  Mukherjee ............ H04L 1/1816
                                                          370/280
(Continued)

FOREIGN PATENT DOCUMENTS

CN          104509021 A    4/2015
EP            3340703 A1    6/2018
(Continued)

OTHER PUBLICATIONS

Huawei, HiSilicon, "On DL multiplexing of URLLC and eMBB transmissions", 3GPP TSG RAN WG1 Adhoc Meeting R1-1700022, Spokane, WA, USA, Jan. 16-20, 2017, total 12 pages.
(Continued)

*Primary Examiner* — Christine T Duong
(74) *Attorney, Agent, or Firm* — Slater Matsil, LLP

(57) ABSTRACT

Aspects of the disclosure pertain to systems and methods for multiplexing of low latency and latency tolerant communications. When low latency traffic pre-empts latency tolerant traffic in a first interval, the pre-empted low latency traffic can be transmitted in a subsequent interval. There are multiple designs disclosed for notifying UE that are affected by the pre-emption events. The various designs include implicit or explicit notification that can be semi-static or dynamic. Examples of the notification include notification of that a pre-emption event occurs, notification of the location of the pre-emption event, notification of whether a supplementary transmission will occur and notification of the location of the supplementary transmission.

21 Claims, 22 Drawing Sheets

(51) Int. Cl.
*H04L 5/00* (2006.01)
*H04L 1/00* (2006.01)
*H04W 72/04* (2009.01)
*H04W 28/10* (2009.01)

(52) U.S. Cl.
CPC .......... *H04L 1/1887* (2013.01); *H04L 5/0073* (2013.01); *H04L 5/0091* (2013.01); *H04L 5/0094* (2013.01); *H04L 27/2602* (2013.01); *H04W 72/042* (2013.01); *H04L 5/0007* (2013.01); *H04W 28/10* (2013.01)

(56) References Cited

U.S. PATENT DOCUMENTS

| | | | |
|---|---|---|---|
| 2017/0150367 A1 | 5/2017 | Han et al. | |
| 2017/0245156 A1 | 8/2017 | Gou et al. | |
| 2018/0027493 A1* | 1/2018 | Li | H04W 72/12 370/280 |
| 2018/0035332 A1* | 2/2018 | Agiwal | H04J 11/003 |
| 2018/0063749 A1 | 3/2018 | Islam | |
| 2018/0070341 A1 | 3/2018 | Islam | |
| 2018/0070347 A1 | 3/2018 | Chen et al. | |
| 2019/0281622 A1* | 9/2019 | Hwang | H04W 72/1273 |
| 2019/0327748 A1* | 10/2019 | Yang | H04W 72/10 |
| 2020/0008216 A1* | 1/2020 | Iyer | H04W 72/1242 |

FOREIGN PATENT DOCUMENTS

| | | |
|---|---|---|
| EP | 3603259 A1 | 2/2020 |
| WO | 2015180551 A1 | 12/2015 |
| WO | 2015188557 A1 | 12/2015 |
| WO | 2016119530 A1 | 8/2016 |
| WO | 2017014572 A1 | 1/2017 |
| WO | 2017034194 A1 | 3/2017 |
| WO | 2018175420 A1 | 9/2018 |

OTHER PUBLICATIONS

LG Electronics,"Discussion on multiplexing of eMBB and URLLC for downlink",3GPP TSG RAN WG1 Meeting #88 R1-1702488,Athens, Greece Feb. 13-17, 2017,total 7 pages.

Sequans Communications, "On dynamic resource sharing between URLLC and eMBB in DL", 3GPP TSG RAN WG1 AH_NR Meeting, R1-1700642, Jan. 16-20, 2017, 6 Pages, Spokane, USA.

Huawei et al, "On DL multiplexing of URLLC and eMBB transmissions", 3GPP TSG RAN WG1 Meeting #88, R1-1701663, Feb. 13-17, 2017, Athens, Greece.

Sequans Communications, "Preemption-based multiplexing of URLLC and eMBB in DL", 3GPP TSG RAN WG1 Meeting #88, R1-1702117, Feb. 13-17, 2017, Athens, Greece.

Intel Corporation, "Uplink URLLC Transmisson Based on Scheduling Request and Grant", 3GPP TSG RAN WG1 NR Ad-Hoc Meeting, R1-1700376, Jan. 16-20, 2017, 8 Pages, Spokane, USA.

Intel Corporation "Remaining details of DL pre-emption indication", 3GPP TSG RAN WG1 NR Ad-Hoc #2, R1-1710575, Jun. 27-30, 2017, 6 Pages, Qingdao, P.R. China.

* cited by examiner

SYSTEM AND METHOD FOR MULTIPLEXING TRAFFIC

RELATED APPLICATIONS

This application claims priority to U.S. Provisional Application No. 62/475,762 filed on Mar. 23, 2017, entitled "System and Method For Multiplexing Traffic", which is incorporated by reference in its entirety.

TECHNICAL FIELD

The present invention relates generally to a system and method for wireless communications, and, in particular embodiments, to a system and method for multiplexing of low latency and latency tolerant communications.

BACKGROUND

In some wireless communication systems, an electronic device (ED), such as a user equipment (UE) wirelessly communicates with one or more base stations (BS). A wireless communication from an ED to a BS is referred to as an uplink communication. A wireless communication from a BS to an ED is referred to as a downlink communication. Resources are required to perform uplink and downlink communications. For example, a BS or a group of BSs may wirelessly transmit data to an ED in a downlink communication at a particular frequency for a particular duration of time. The frequency and time duration are examples of resources.

A BS allocates resources for downlink communications to the EDs served by the BS. The wireless communications may be performed by transmitting orthogonal frequency-division multiplexing (OFDM) symbols.

Some EDs served by a BS, or a group of BSs, may need to receive data from the BS with lower latency than other EDs served by the BS. For example, a BS may serve multiple EDs, including a first ED and a second ED. The first ED may be a mobile device carried by a user who is using the first ED to browse on the Internet. The second ED may be equipment on an autonomous vehicle driving on a highway. Although the BS is serving both EDs, the second ED may need to receive data with lower latency compared to the first ED. The second ED may also need to receive its data with higher reliability than the first ED. The second ED may be an ultra-reliable low latency communication (URLLC) ED, whereas the first ED may be an enhanced mobile broadband (eMBB) ED.

EDs that are served by a BS and that require lower latency downlink communication will be referred to as "low latency EDs" or "low latency UE". The other EDs served by the BS will be referred to as a "latency tolerant EDs" or "latency tolerant UEs". Data to be transmitted from the BS to a low latency ED will be referred to as "low latency data", and data to be transmitted from the BS to a latency tolerant ED will be referred to as "latency tolerant data".

SUMMARY

Technical advantages are generally achieved by embodiments of this disclosure which describe a system and method for multiplexing traffic.

According to an aspect of the present disclosure, there is provided a method for notifying a UE of pre-emption of a portion of traffic in a first interval, the method comprising: scrambling at least part of an indication of the pre-emption of the portion of traffic in the first interval using a radio network temporary identifier (RNTI); and transmitting the indication, including the scrambled part, to the UE in a downlink control information (DCI) message on a physical downlink control channel (PDCCH).

In some embodiments, the indication further comprises an identification of a location of the portion of traffic that was pre-empted in the first interval.

In some embodiments, the method further comprises transmitting the RNTI to the UE that is used to scramble the at least part of the indication.

In some embodiments, the method further comprises transmitting an indication of granularity of a time-frequency resource.

In some embodiments, transmitting an indication of granularity of a time-frequency resource comprises transmitting the indication of granularity by higher layer signaling.

In some embodiments, transmitting the indication comprises transmitting the indication in the first interval.

In some embodiments, transmitting the indication comprises transmitting the indication in a second interval subsequent to the first interval.

In some embodiments, transmitting the indication comprises transmitting an indication that no transmission to the UE is present in a time-frequency resource corresponding to the portion of traffic indicated to be pre-empted in the first interval.

In some embodiments, the time-frequency resource is one or more of: at least one symbol; and at least one resource block.

In some embodiments, transmitting the indication comprises transmitting the indication in a group common control region.

In some embodiments, when a carrier has more than one active bandwidth part, transmitting an indication for each active bandwidth part.

In some embodiments, a size of a transmission resource used to transmit the indications for each active bandwidth part contains xy bits, where x defines a number of discrete time domain elements of a particular granularity and y defines a number of discrete frequency domain resources of a particular granularity in the first scheduling interval.

According to another aspect of the present disclosure, there is provided a method for notifying a UE of pre-emption of a portion of traffic in a first interval, the method comprising: receiving on a physical downlink control channel (PDCCH), a downlink control (DCI) message containing an indication, at least a part of which is scrambled, that the portion of traffic was pre-empted in the first interval; using a radio network temporary identifier (RNTI) to decode the scrambled part of the indication that the portion of traffic was pre-empted in the first interval.

In some embodiments, the indication further comprises an identification of a location of the portion of traffic that was pre-empted in the first interval.

In some embodiments, the method further comprises receiving an identification of the RNTI to be used to unscramble the scrambled part of the indication.

In some embodiments, the method further comprises receiving an indication of granularity of a time-frequency resource.

In some embodiments, receiving an indication of granularity of a time-frequency resource comprises receiving the indication of granularity by higher layer signaling.

In some embodiments, receiving the indication comprises receiving the indication in a second interval subsequent to the first interval.

In some embodiments, receiving the indication comprises receiving an indication that no transmission is present in a time-frequency resource corresponding to the portion of traffic indicated to be pre-empted in the first interval.

In some embodiments, the method further comprises the defined time-frequency resource is one or more of: at least one symbol; and at least one resource block.

In some embodiments, receiving the indication comprises receiving the indication in a group common control region.

In some embodiments, when the UE has more than one active bandwidth part in a system bandwidth, receiving an indication for each active bandwidth part.

According to a further aspect of the present disclosure, there is provided an apparatus comprising at least one antenna, a processor and a computer-readable media. The computer-readable media has stored thereon processor-executable instructions, that when executed by the processor, cause the apparatus to: scramble at least a part of an indication of the pre-emption of the portion of traffic in the first interval using a radio network temporary identifier (RNTI); and transmit the indication, including the scrambled part, to the UE in a downlink control information (DCI) message on a physical downlink control channel (PDCCH).

According to yet another aspect of the present disclosure, there is provided an apparatus comprising at least one antenna, a processor, and a computer-readable media. The computer-readable media has stored thereon processor-executable instructions, that when executed by the processor, cause the apparatus to: receive on a physical downlink control channel (PDCCH), a downlink control (DCI) message containing an indication, at least a part of which is scrambled, that the portion of traffic was pre-empted in the first interval; use a radio network temporary identifier (RNTI) to decode the scrambled part of the indication that the portion of traffic was pre-empted in the first interval.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
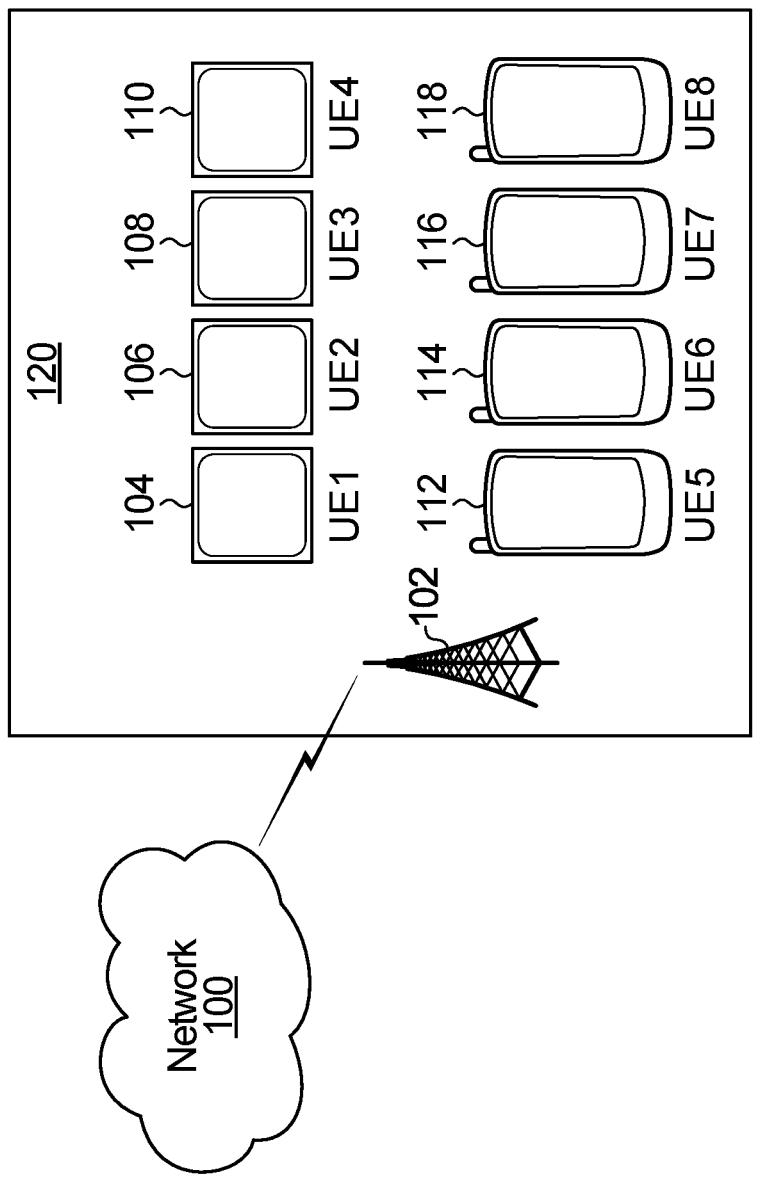
FIG. 1 illustrates a network for communicating data.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Generally, embodiments of the present disclosure provide a method and system for the coexistence of mixed services in a flexible time-frequency frame structure. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

For the purpose of this description, a first traffic type user equipment (FTTUE) is a UE that is configured to transmit and receive traffic of a first type, for example latency tolerant traffic such as eMBB traffic. A second traffic type UE (STTUE) is a UE that is configured to transmit and receive traffic of a second type, for example low latency traffic such as URLLC traffic. However, a given STTUE may also have other capabilities including, but not limited to, handling traffic of the first traffic type and receiving at least two traffic types. In some embodiments, the traffic of the first type is relatively latency tolerant compared to the traffic of the second type. In a specific example, the traffic of the first type is eMBB traffic, and the traffic of the second type is URLLC traffic, eMBB traffic being relatively latency tolerant compared to URLLC traffic.

It should be understood that references to URLLC and eMBB in this disclosure are only examples of low latency traffic and latency tolerant traffic, and that the methods described herein are equally applicable to any two traffic types having different latency requirements. Some examples include low latency traffic not requiring high reliability, and latency tolerant traffic with less stringent reliability requirements. Some use cases also include massive machine type communication (mMTC) and/or narrowband Internet of Things (IoT). The multiplexing schemes discussed in the invention may also relate to the examples mentioned above, wherever applicable.

Referring to FIG. 1, a schematic diagram of a network 100 is shown. BS 102 provides uplink and downlink communication with the network 100 for a plurality of UEs 104-118 within a coverage area 120 of the BS 102.

As used herein, the term "BS" refers to any component (or collection of components) configured to provide wireless access to a network, such as an evolved NodeB (eNB), gNodeB (gNB), a macro-cell, a femtocell, a Wi-Fi access point (AP), or other wirelessly enabled devices. The terms "eNB" and "BS" are used interchangeably throughout this disclosure. BSs may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a BS, such as a mobile station (STA) or other wirelessly enabled devices. In some embodiments, the network 100 may comprise various other wireless devices, such as relays, low power nodes, etc.

In a specific example, UEs 104-110 are STTUEs, and UEs 112-118 are FTTUEs. In a more specific example, the UEs 104-110 employ orthogonal frequency division multiplexing (OFDM) to transmit URLLC traffic. It is contemplated that OFDM may be used in combination with a non-orthogonal multiple access scheme such as Sparse Code Multiple Access (SCMA). UEs 112-118 may, for example, transmit eMBB traffic. UEs 112-118 may also use OFDM. The BS 102 may, for example, be an access point. The described functions of the BS 102 may also be performed by multiple BSs using synchronous downlink transmission. FIG. 1 shows one BS 102 and eight UEs 104-118 for illustrative purposes, however there may be more than one BS 102 and the coverage area 120 of the BS 102 may include more or fewer than eight UEs 104-118 in communication with the BS 102.

Figure 2:
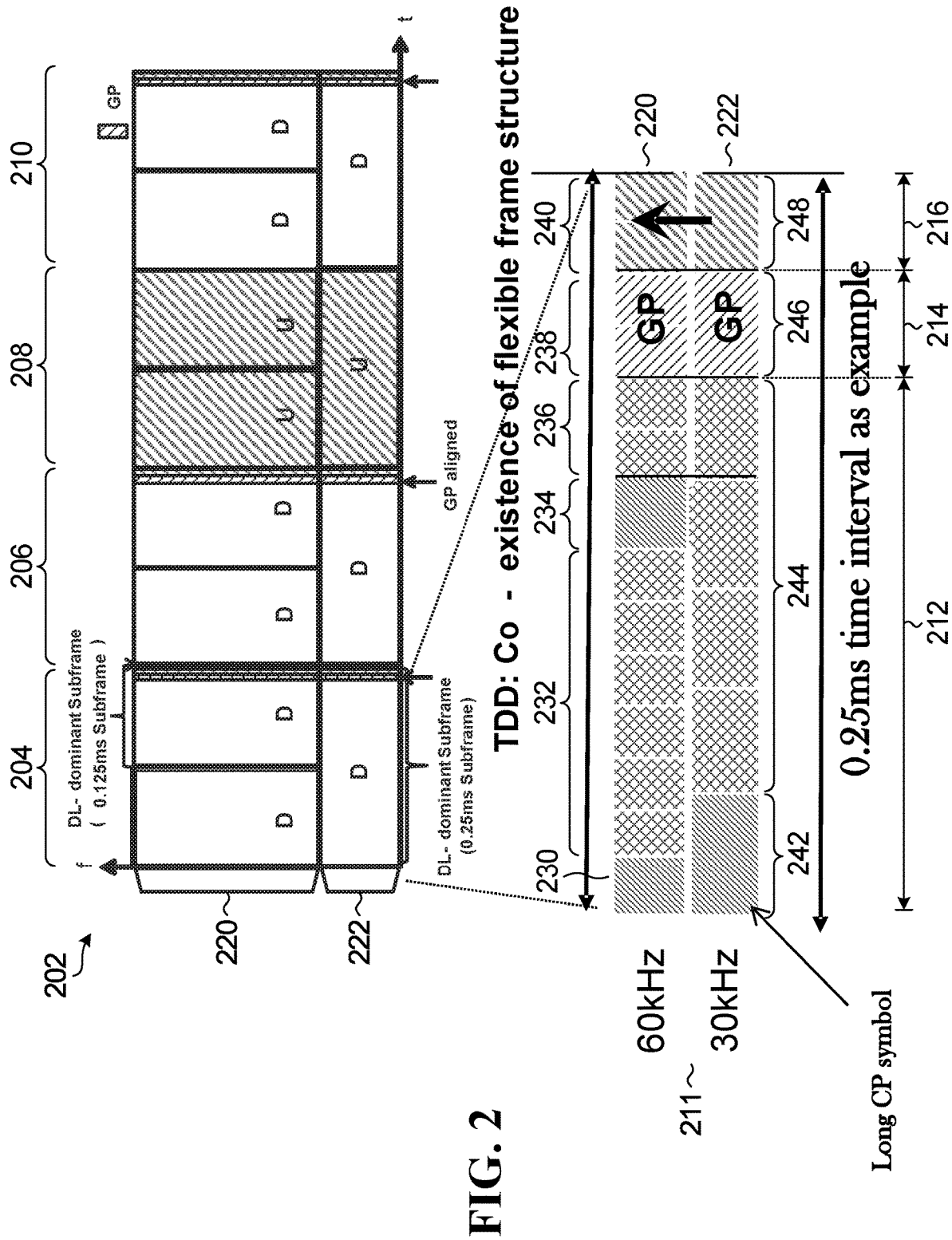
FIG. 2 is an example of a frame structure provided by an embodiment of the invention.

The network and the UEs of FIG. 1 can communicate with each other using time division duplex (TDD) or frequency division duplex (FDD) frame structures. Each sub-frame has a downlink segment, an uplink segment and a guard period separating the downlink segment from the uplink segment. Referring to FIG. 2, shown is a specific example of a time division duplex frame structure 202. The frame structure 202 is composed of four sub-frames 204, 206, 208, 210. In some embodiments, sub-frames can be downlink dominant, meaning more resources are allocated for downlink traffic compared to uplink traffic, or uplink dominant.

In some embodiments, the time division duplex communications are transmitted in two or more sub-bands each operating with a respective different sub-carrier spacing. In the example of FIG. 2, shown are two sub-bands 220,222 operating with different sub-carrier spacings. Specifically, sub-band 220 operates with a 60 kHz sub-carrier spacing, and sub-band 222 operates with a 30 kHz sub-carrier spacing. It is contemplated that any two suitable sub-carrier spacings can be used. For example, two numerologies with different sub-carrier spacings can be chosen from a set of scalable numerologies having sub-carrier spacings that differ by a factor of $2^m$, where m is an integer. Some other examples of scalable numerologies include 15 kHz and 30 kHz sub-carrier spacings; and 15 kHz and 60 kHz sub-carrier spacings.

The TDD nature of each sub-frame is generally indicated at 211 which shows a self contained sub-frame structure including downlink segment 212, guard period 214 and uplink segment 216. For this example, OFDM symbols for data transmitted in the 60 kHz band have a time duration that is half that of OFDM symbols for data in the 30 kHz band. The contents of the sub-frame in the 60 kHz sub-band are indicated at 220 and include 10 downlink OFDM symbols 230, 232, 234, and 236, followed by a guard period that includes two OFDM symbol durations 238, and two uplink symbols 240. The contents of the sub-frame in the 30 kHz sub-band are indicated at 222 and include 5 OFDM symbols 242, 244, followed by a guard period that includes one OFDM symbol duration 246, and then one uplink symbol 248. It should be understood that this design is implementation specific. However, importantly, the TDD structure of the contents in the two sub-bands is aligned in the sense that the uplink transmissions on one sub-band (e.g. the 60 kHz sub-band) are aligned with uplink transmissions in another sub-band (e.g. the 30 kHz sub-band), and a similar alignment is present for downlink transmissions and the guard period. One or more symbols, in this example the symbols 230 and 234, have a longer cyclic prefix than the remaining symbols 232 of their sub-bands. Similarly, the symbol 242 has a longer cyclic prefix than the remaining symbols 244 of its sub-band. The different cyclic prefix durations may be used to ensure the desired alignment of the guard period and the uplink and downlink transmissions.

In the example of FIG. 2, the overall frame structure 202 is 1 ms in duration, and the sub-frames 204, 206, 208, 210 are 0.25 ms in duration. In the 60 kHz band, each 0.25 ms sub-frame is further divided into two halves each of 0.125 ms. The frame structure 220 for the 60 kHz band includes symbols 230,232 in the first half and includes symbols 234, 236, 238, 240 in the second half.

In some implementations, for each time division duplex frame or sub-frame, scheduling information in respect of downlink traffic of the first type may be sent based on a predefined scheduling interval which may be equal to the duration of one time division duplex frame. In other implementations, a scheduling interval length for the first type of traffic can be dynamically varied. For example, the scheduling interval may be one slot for a first period of time and an aggregation of time slots for a second period of time. Furthermore, in the case of DL-centric TDD, it may not be the case that the first type of traffic is scheduled using all of the DL symbols available in a TDD sub-frame. In addition, for each sub-frame, scheduling information is transmitted in respect of downlink traffic of the second type based on a scheduling interval equal to the duration of one sub-frame. For the example of FIG. 2, the scheduling information for the traffic of the first type is sent at the beginning of the time division duplex scheduling interval, and is based on a scheduling interval of 0.5 ms or less, corresponding to the duration of the downlink portion of the frame structure. The scheduling information for the traffic of the second type is sent at the beginning of each sub-frame, and is based on a 0.25 ms scheduling interval. The scheduling information indicates resources that are allocated for traffic of the first type or traffic of the second type in the respective scheduling interval. In FIG. 2, it should be understood that traffic of the first type may be transmitted in the resources allocated primarily for traffic of the second type, or vice versa, according to the methods discussed below.

It should be understood that, although embodiments are described herein in reference to pre-emption of latency-tolerant downlink transmissions, they are also applicable to the pre-emption of latency-tolerant uplink transmissions. In particular, a latency tolerant UE may receive downlink signaling in a PDSCH or group common PDCCH, or UE specific PDCCH or according to any of the signaling embodiments described below, indicating the presence of a low latency uplink transmission. The latency tolerant UE may be responsive to this downlink signaling to pre-empt or postpone its uplink transmission in resources that will contain low latency uplink transmission, as indicated by the downlink signaling. This may be particularly applicable when the low latency uplink transmissions are grant-based, or when the low-latency uplink transmissions are otherwise predictable, e.g. re-transmissions of previous grant-free transmissions. In one example, group-common PDCCH containing DL and UL pre-emption information can be distinguished by DL and UL specific indication RNTI.

In some embodiments, at some time after the first sub-frame, information is transmitted that updates the scheduling information in respect of downlink traffic of the first type in a sub-frame other than the first sub-frame. In some implementations, the information that updates the scheduling information may include an indication of a pre-emption of traffic of the first type. In some implementations, the information that updates the scheduling information may include information to dynamically configure the scheduling interval length or other scheduling parameters that a UE may need to know to receive and decode the transmitted traffic.

When the BS 110 has data to transmit to the UEs, the BS 110 transmits this data in one or more downlink transmissions using allocated resources, for example time/frequency resources. Specific resource partitions may be assigned for transmissions to the UEs. A portion of the time/frequency resources may be reserved for the downlink transmission of low latency data, and this portion may be referred to as the low latency resources. Some other portion of the time/frequency resources may be reserved for the downlink transmission of latency tolerant data, and this portion may be referred to as the latency tolerant resources. The portion of resources reserved as low latency resources may change dynamically or semi-statically over time, e.g. based on factors such as traffic load, bandwidth requirements, and latency.

In one embodiment, both low latency and latency tolerant data are transmitted in a shared time-frequency resource anywhere within the transmission bandwidth. The two traffic types can co-exist without a pre-allocated bandwidth partition. For example, low latency and latency tolerant data may occupy resources in a time-domain multiplexing (TDM) manner, either by a method of scheduling or by pre-emption.

Low latency data may be bursty or sporadic in nature, and may be transmitted in short packets. It may be inefficient to dedicate resources for low latency data. Therefore, a coexistence region may be defined in which a resource assignment for latency tolerant traffic overlaps with resource assignment for low latency traffic in the time and frequency domains. Latency tolerant UEs may monitor low latency traffic presence during their transmission if they are scheduled in the coexistence region. In another example, no specific coexistence region is reserved. Coexistence may happen dynamically within shared time-frequency resources within a carrier BW. Furthermore, it is also possible that coexistence resources may span multiple carrier BWs. Referring to FIG. 2, the sub-band 220 may be a co-existence region and the sub-band 222 may be a latency tolerant region.

Existing technologies may utilize indication-based downlink (DL) multiplexing. Possible signalling solutions for implicit and explicit indication of low latency traffic arrival during ongoing transmission of latency tolerant traffic may be desirable. Proposed solutions may use interleaving of the code blocks of latency tolerant traffic, and latency tolerant transport block (TB) mapping may also be updated for better coexistence experience.

The low latency resources may be partitioned into transmission time units (TTUs). In some implementations, TTUs of variable length are supported for scheduling low latency traffic. In other implementations, there may be one or only a few basic TTU lengths supported. Longer lengths can be attained by aggregation of multiple TTUs. A TTU of the low latency resources may be referred to as a "low latency TTU". A TTU may be a unit of time that can be allocated for a particular type of transmission, for example a low latency data transmission. The transmission can be scheduled or unscheduled. In some embodiments, a TTU is the smallest unit of time that can be allocated for a transmission of a particular type. Also, a TTU, or several TTUs, is sometimes referred to as a transmission time interval (TTI). A low latency TTU, of the duration of a mini-slot, can include any number of symbols that is fewer than the number of symbols in a slot of a latency tolerant TB. More generally, a TTU assigned for transmission of low latency traffic may comprise one or more symbols where the number of symbols may be less than a slot. A slot may comprise an integer number of symbols such as 7, 14, 21, 28 symbols. It is also possible that an aggregation of mini-slots for a single low latency transmission may result in a transmission of longer duration than a slot. As a result, in some cases a low latency transmission may have a duration that is longer than a slot, such as when a transmission of a low latency TB comprises bundling of multiple TTUs which may be beneficial for UEs at cell edge.

The latency tolerant resources may be partitioned into scheduling intervals, and a scheduling interval of the latency tolerant resources may be referred to as a "latency tolerant UE scheduling interval". A latency tolerant UE scheduling interval is the smallest interval of time that may be scheduled for a data transmission to a latency tolerant UE. A latency tolerant scheduling interval may also be referred to as a latency tolerant TTU. A latency tolerant TTU may span one or multiple slots of a numerology, or may be an aggregation of one or more slots with one or more mini-slots. For example, a latency tolerant TTU can be 1 ms consisting of 14 symbols based on 15 kHz subcarrier spacing. If a slot is defined as 7 symbols, then in this example, a latency tolerant TTU or scheduling interval spans two slots. In these examples, a slot is assumed to contain 14 or 7 symbols. A low latency TTU may have a duration that is shorter than a latency tolerant UE scheduling interval. By transmitting TBs of a shorter duration in the low latency resources, the latency of the data transmissions to the low latency UEs may be reduced.

In some embodiments, the low latency resources have a numerology that is different from the numerology of the latency tolerant resources, e.g. the subcarrier spacing of the low latency resources is different from the subcarrier spacing of the latency tolerant resources. The low latency resources may have a subcarrier spacing that is larger than the subcarrier spacing of the latency tolerant resources. For example, the subcarrier spacing of the low latency resources may be 60 kHz, and the subcarrier spacing of the latency tolerant resources may be 15 kHz. By using larger subcarrier spacing, the duration of each OFDM symbol in the low latency resources may be shorter than the duration of each OFDM symbol in the latency tolerant resources. Latency tolerant TTUs and low latency TTUs may include the same number of symbols, or different numbers of symbols. The symbols in latency tolerant TTUs and low latency TTUs may have the same numerology, or different numerologies. If a TTU is defined as having a fixed number of OFDM symbols regardless of numerology, then more than one low latency TTU can be transmitted during a latency tolerant UE scheduling interval. For example, the latency tolerant UE scheduling interval may be an integer multiple of the low latency TTU. In another embodiment, a latency tolerant UE scheduling interval is not an integer multiple of the low latency TTU. For example, when the latency tolerant UE scheduling interval is 7 symbols and the low latency TTU is 2 symbols. The length of symbols in latency tolerant TTUs and/or low latency TTU may be varied by changing the length of a cyclic prefix in the latency tolerant TTUs and/or low latency TTU. In other embodiments, the low latency resources and the latency tolerant resources have the same numerology. A low latency TTU may then be defined to have fewer OFDM symbols compared to the number of OFDM symbols in a latency tolerant UE scheduling interval, such that there will still be more than one low latency TTU within a latency tolerant UE scheduling interval. For example, the duration of a low latency TTU may be as short as a single OFDM symbol. It is also contemplated that the low latency transmission and the latency tolerant transmission might not have the same number of symbols per TTU, whether or not they have the same numerology. If different numerology is used, the symbols of a low latency TTU with larger subcarrier spacing may align at the boundary of the one or multiple symbols of the latency tolerant TTU with a smaller subcarrier spacing.

A TTU may be divided into a number of slots, for example 2 slots. A low latency slot duration may be equal to or shorter than a latency tolerant slot or a long-term evolution (LTE) slot. A mini-slot may contain any number of symbols that is fewer than the number of symbols in a slot, e.g., 1, 2, 3, 4, 5, 6 symbols if a slot is 7 symbols.

Figure 3:
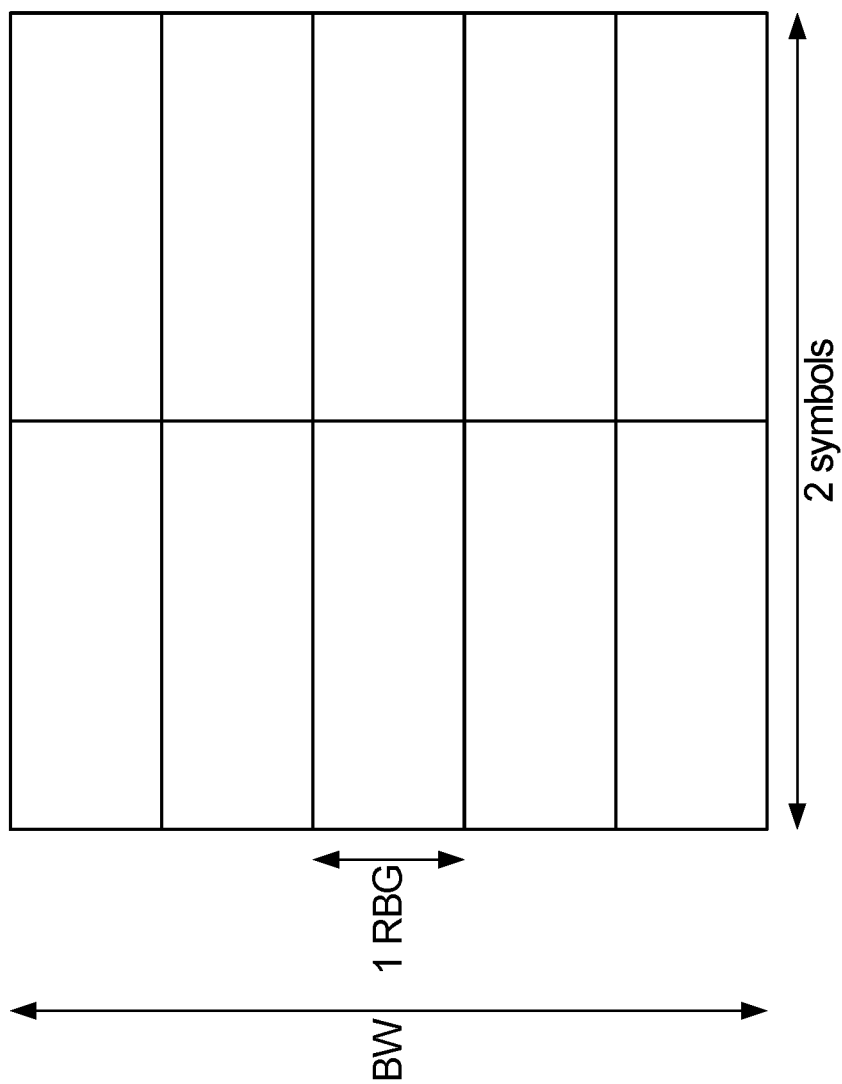
FIG. 3 illustrates an embodiment of mini-slot architecture.

FIG. 3 illustrates an embodiment mini-slot architecture that may be used in an interval. In this example, a mini-slot spans two symbols. The interval may be made up of multiple mini-slots. A low latency interval may include physical control format indicator channel (PCFICH) and/or physical hybrid automatic repeat request (HARQ) indicator channel (PHICH). Alternatively, PCFICH and/or PHICH indicators may be excluded from a low latency interval. Control information of a low latency TB may be limited to the first symbol. Control information of a low latency TB can be split into two parts. The first part contains necessary control information for data reception and demodulation. The second part contains other parts of control information that are not necessary for data demodulation in the current low latency TTU, for example, PUCCH power control. Resource elements (REs) containing control information for low latency traffic may or may not be contiguous. The same cell specific RS (CRS) or demodulation reference signal (DMRS) may be used for low latency control information and data. Because time-domain granularity is short, multiple resource blocks can be grouped for minimum resource granularity when a mini-slot is scheduled. Resource block group (RBG) based resource allocation granularity may be based on compact downlink control information (DCI) or 1 RBG with minimum granularity.

DMRS may be front-loaded in one or more symbols at the beginning of the mini-slot or distributed over the mini-slot duration. In some implementations, increasing the aggregation level of control channel elements (CCE) in a physical downlink control channel (PDCCH) is supported. Reducing the number of UEs scheduled per mini-slot may increase reliability. Each mini-slot can contain its own DMRS. However, if an aggregation of mini-slots are scheduled together, the network may choose not to include DMRS in some of the mini-slots that are part of an aggregation. If the transmission is based on an aggregation of mini-slots, the UE may implicitly know, based on an aggregation level, whether or not DMRS is included in each of the mini-slots. The aggregation level can be indicated in the UE specific DCI or group-common DCI. For example, if two mini-slots are aggregated, the UE may not expect DMRS in the second mini-slot, and use of the front-loaded DMRS of the first mini-slot may be sufficient. In another embodiment, the UE may be pre-configured to receive DMRS in some or all or of the mini-slots that are aggregated or the UE may be notified by semi-static signaling, such as RRC signaling, if the UE is to receive DMRS in some or all of the mini-slots that are aggregated.

Indication of low latency traffic presence may be dynamically signaled via the resources normally reserved for control signaling for either latency tolerant traffic or low latency traffic, or by transmitting additional control signaling within the resources that would otherwise be allocated for data within the latency tolerant interval. For example, a single control message may be used to indicate the presence of low latency traffic, in one or more symbols at or near the end of a latency tolerant scheduling interval in the time-frequency resources where transmission of low latency traffic by pre-emption of the latency tolerant traffic is supported. Control signaling can also, or alternatively, be sent at, or immediately before, the time in which the low latency traffic is scheduled for transmission. The control signaling can be UE specific or cell specific (i.e., a single control signal broadcast to all UEs) or group specific (i.e., a multicast control signal to each group of UEs).

Signaling an indication of the presence of the low latency traffic may be explicit or implicit. For explicit indication, some REs (e.g., contained within one symbol or spanning multiple contiguous or non-contiguous symbols) may be used for signaling the indication. In an embodiment, one or more REs originally scheduled for the latency tolerant traffic but in which low latency transmission actually occurs, may be used for signaling the indication. Low latency TTU scheduling may avoid using the REs containing the pre-emption indication, e.g., low latency traffic may be rate-matched for remaining REs within the low latency TTU. In another embodiment, REs that contain indication signaling do not overlap with the low latency mini-slot resources. For example, the REs containing indication signaling may correspond to different time-frequency resources than the time-frequency resources contained within the symbols of the low latency TTU. REs may contain a group common indication, i.e., the REs used for sending the indication can be outside the RBs scheduled for transmission of a latency tolerant transmission block. The signaling indicating the presence of low latency traffic can be sent over resources that do not overlap with the latency tolerant pilot signals. Alternatively, signaling indicating the presence of low latency traffic may be sent in one or more symbols containing latency tolerant pilot signals, but not in REs containing latency tolerant pilot signals. As yet another alternative, low latency TTUs may be scheduled in REs containing latency tolerant pilot signals. When the low latency transmission is sent over a time-frequency resource that includes latency tolerant pilot signals, low latency data transmission or pilot signals and the latency tolerant pilot signals may be orthogonal to each other. In some cases, it is possible that pilot signals of low latency and latency tolerant TTUs are sent over the same or overlapping resources. Orthogonality of pilot signals is maintained either in the code domain or in the space domain.

Alternatively, one or more REs of latency tolerant symbols near the end of an latency tolerant interval/TTU may be used to notify UEs of low latency traffic that has pre-empted latency tolerant traffic during the whole interval. Any latency tolerant traffic in the interval which was pre-empted in favor of low latency traffic can be transmitted in a subsequent interval. In some embodiments, REs that are used to notify UEs of low latency traffic that have pre-empted latency tolerant traffic may be reserved and not included as part of the scheduling process of latency tolerant transmission.

For implicit indication, existing eMBB control, URLLC control, DMRS, and/or other signaling may be used for indication of the presence of URLLC traffic. Either low latency TTU resources or latency tolerant resources (e.g., eMBB pilot signals) may be utilized. For example, eMBB UEs may blindly detect at least part of control or DMRS of low latency TTU, or both. If eMBB traffic is scheduled in multiple aggregated slots, then in each slot DMRS may signal whether or not that slot contains a low latency transmission. For example, in each TTU/slot of a latency tolerant transmission, a DMRS sequence is chosen by the base station based on whether low latency traffic is present or not. The latency tolerant receiver blindly detects which sequence is sent. In another example, a different pattern of DMRS can be sent if low latency traffic arrives. A set of DMRS sequences or patterns, or both, is configured by higher layer signaling. Latency tolerant UEs can be notified via RRC signaling if the UE needs to blindly detect DMRS from a configured pool of DMRS. One detected DMRS may indicate pre-emption, another may indicate no pre-emption.

The indication can be dynamically signaled to one or more eMBB UEs whose assigned downlink resources have been at least partially pre-empted by another downlink transmission. This indication may increase the likelihood of successful demodulation and decoding of the TB(s) transmitted within the assigned resource based on the pre-empted transmission and/or subsequent (re)-transmissions of the same TB. The indication notifies eMBB UEs that a portion of eMBB traffic has been pre-empted and that a supplementary transmission can be expected. The use of the indication allows the UEs that receive the supplementary transmission to combine an initial punctured transmission and the supplementary transmission for a better chance of successfully decoding the traffic.

Figure 4A:
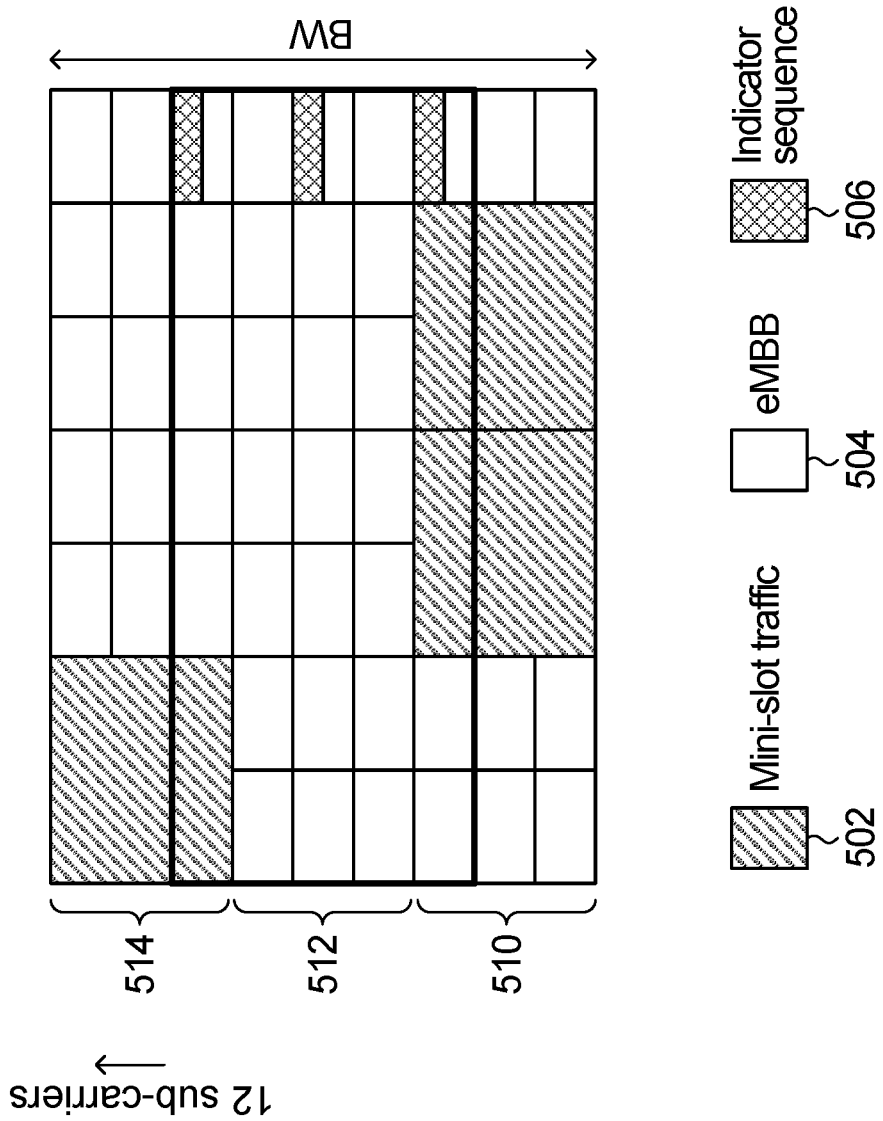
FIG. 4A illustrates an embodiment explicit post indication of mini-slot traffic.

FIG. 4A illustrates an embodiment for explicit post-indication of pre-emption of slot-based traffic by mini-slot traffic. The bandwidth (BW) is comprised of three sub-bands 510, 512, 514. Each sub-band is a Resource Block (RB) including 12 subcarriers. In this example, a mini-slot 502 duration is pre-configured and/or static; a starting location of the mini-slot within the slot is either pre-configured or can occur at any symbol. An indicator sequence 506 may identify time and frequency resources that are pre-empted due to mini-slot based transmission. For example, if a latency tolerant transport block spans the bandwidth of x number of RBs, RBGs, sub-bands, or some other predetermined unit in frequency and a duration of y number of mini-slots or symbol groups in time, then post-indication may contain xy number of bits to identify which time-frequency areas are pre-empted. If overhead is a concern, only time and/or frequency domain pre-emption information can be conveyed. According to the above example, each post-indication may contain only x bits if only time domain pre-emption information is provided. According to the above example, each post-indication may contain only y bits if only frequency domain pre-emption information is provided. In another example, several time-frequency resources can be grouped and group-based pre-emption indication can be provided, which may require a lesser number of bits compared to the case when information of all time-frequency resource granularities within a latency tolerant transport block is conveyed. A time-frequency resource group can have a bandwidth equivalent to a resource block group or a partition of the whole transmission bandwidth in frequency and a group of symbols in time, where the group of symbols may or may not be the same as a number of symbols in a low latency TTU.

Figure 4B:
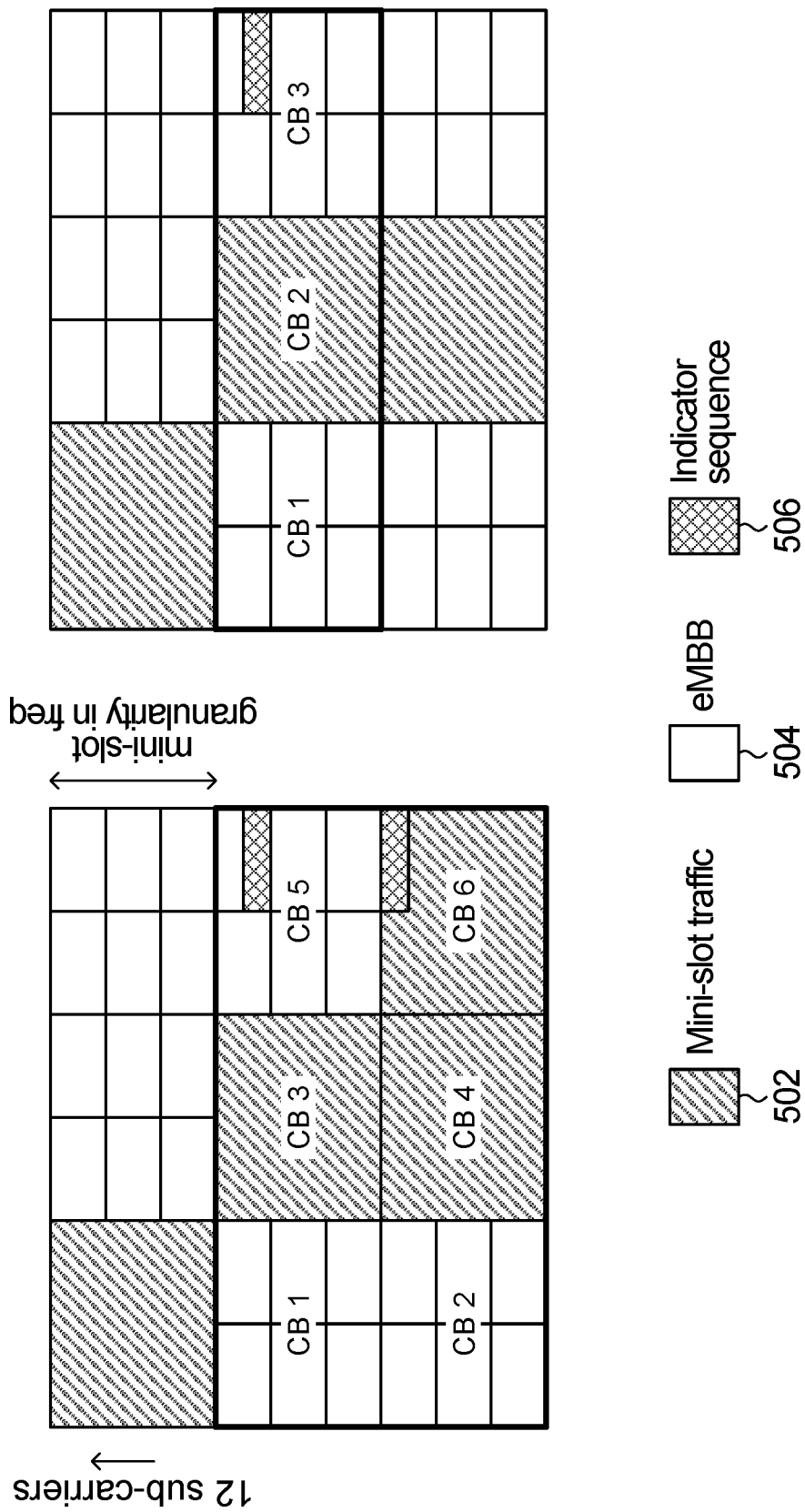
FIG. 4B illustrates an embodiment indication of low latency traffic.

FIG. 4B illustrates an embodiment of latency tolerant codeblock (CB) mapping. In this example, the minimum frequency-domain granularity available for scheduling low latency and latency tolerant traffic is the same. This permits low latency traffic to be scheduled within the boundary of a single latency tolerant TB, which can reduce signaling overhead by ensuring that a minimum frequency domain granularity of low latency transmission only affects a single latency tolerant TB.

FIG. 4B illustrates an embodiment indication of low latency traffic. This example is also a post-indication example. The pre-emption indication may be utilized to indicate the number of CBs punctured. In this example, the eMBB CBs are punctured. This may be more suitable for a scheme in which the punctured eMBB CBs are transmitted at a later time. Further quantization levels may also be possible, e.g., CB 25% punctured, 50% punctured etc. The indication field can additionally contain information regarding the level of puncture. A single bit indication may be used to indicate the presence or absence of URLLC, or the presence or absence of a threshold amount of URLLC, either for the entire latency tolerant transmission block or in an individual portion of the latency tolerant transmission block. The signaling may be transmitted upon arrival of the low latency traffic for transmission, during the time-frequency resources that are used for transmission of the low latency traffic, at the end of the affected latency tolerant TB, or at any other suitable time. As described above, the signaling may be a single broadcast signal to all UEs, one or more multicast signal to one or more groups of UEs, or one or more UE-specific signals to one or more individual UEs.

Figure 5:
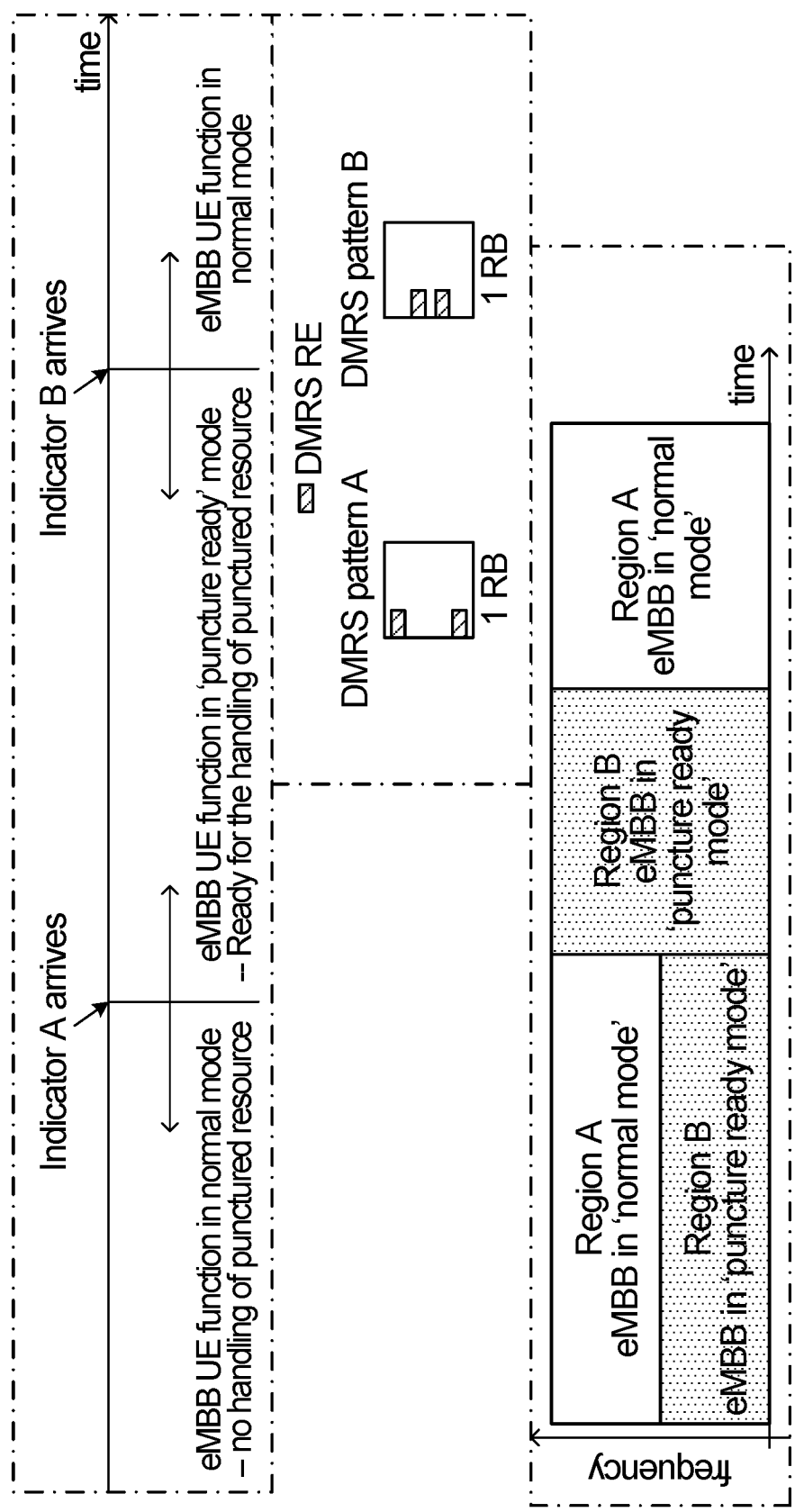
FIG. 5 illustrates embodiments of mini-slot configurations and signaling.

FIG. 5 shows an example of using an indicator to notify to the eMBB UE whether there is URLLC service in a period of time or in a certain frequency band. If there is no URLLC service in a period of time or in a certain frequency band, then in that time-frequency region, the eMBB UE would not need to monitor for low latency control signaling or account for possible puncturing during its decoding process. If there is URLLC service, the eMBB UE would function in a co-existence (or puncture-ready) mode, which may involve being able to decode a received TB that has been punctured. This indication can be explicit, e.g., using higher layer signaling (Radio Resource Control, RRC) or dynamic physical layer signaling. It can also be implicit, e.g., using different DMRS patterns. A first DMRS pattern indicates no URLLC traffic is expected, and a second DMRS pattern indicates the possibility of URLLC traffic, so handling of punctured eMBB information may be needed. It can also be done via sub-band division. One sub-band is eMBB-only, the other sub-band is eMBB+URLLC. The benefit of this indication is to save an eMBB UE's processing overhead if there is no URLLC traffic in a period of time or in a certain frequency band. Based on the first stage signaling, either semi-static or dynamic, the eMBB UE(s) will decide whether to monitor for the pre-emption indication or not.

Latency tolerant traffic, such as eMBB data, that is impacted by pre-emption events can be retransmitted on a scheduled basis. A first option for supplementary transmission scheduling may be to schedule automatic supplementary transmission before the UE attempts to decode data and generate an acknowledgement (ACK) for a successful decoding of the data or a negative acknowledgement (NACK) for an unsuccessful decoding of the data. If sufficient time is allocated before an ACK/NACK is to be transmitted, the UE may consider the supplementary transmission as part of initial data decoding. A second option for supplementary transmission may be to use HARQ re-transmission of the pre-empted latency tolerant data based on an ACK/NACK procedure. The UE attempts to decode the received data and if the UE is unsuccessful, the UE sends a NACK. The base station then retransmits based on the data that was not sent due to the pre-emption event. The data sent either before or after generating the ACK or NACK can be the same or a different redundancy version of the pre-empted data.

Figure 6:
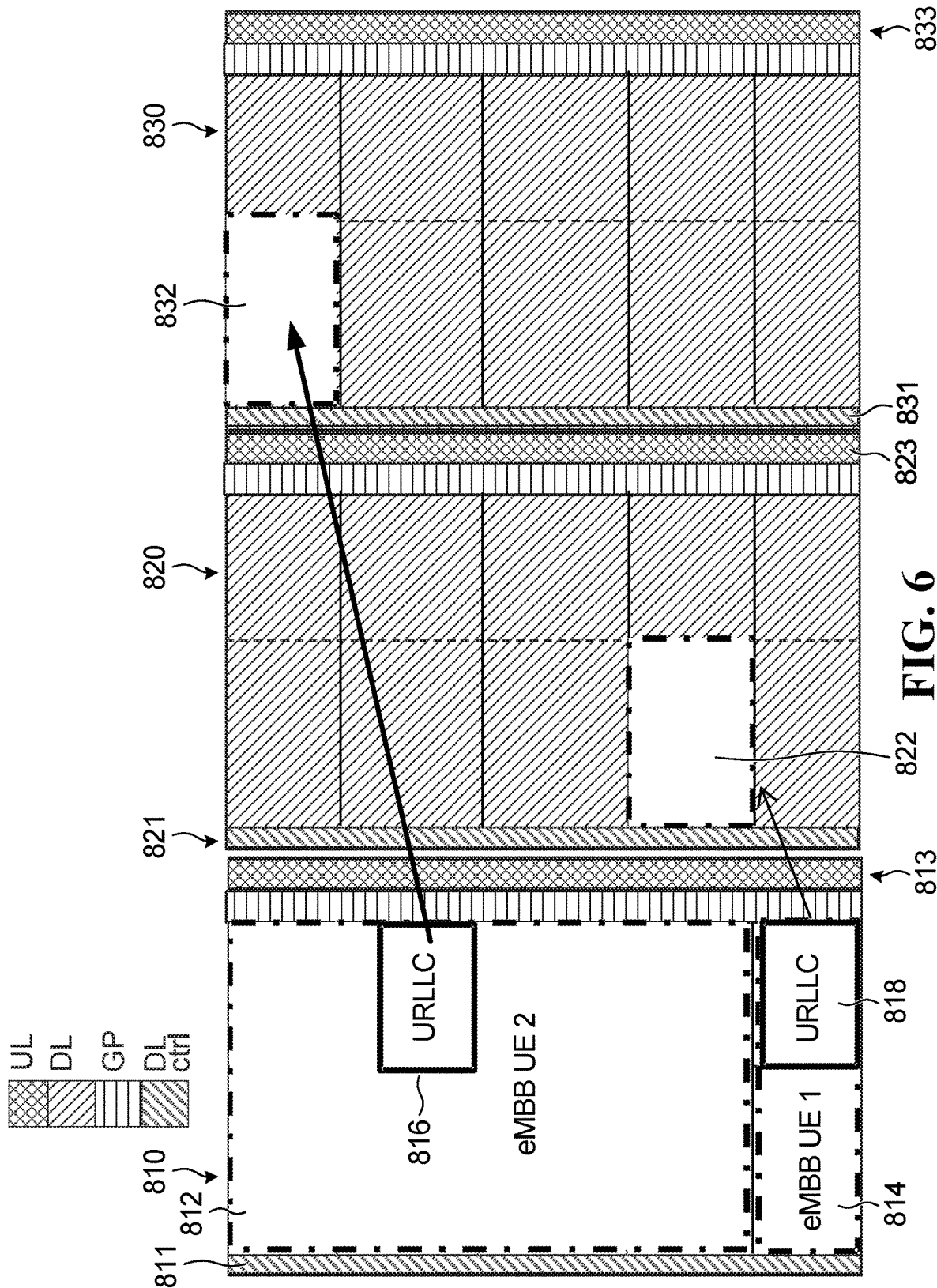
FIG. 6 illustrates an example of information being pre-empted in a first interval and retransmitted in a subsequent interval according to an aspect of the disclosure.

FIG. 6 illustrates an example of a transmission resource that has predominantly scheduled transmission of latency tolerant traffic, but allows low latency traffic to pre-empt the latency tolerant traffic when appropriate.

FIG. 6 illustrates a combination of three DL-centric slots/intervals 810, 820 and 830 in which the first interval 810 includes control information 811, HARQ feedback 813 and scheduled transmission resources 812, 814 for two eMBB UEs. However, in transmission resource 812 allocated for eMBB UE 2, a sub-portion 816 of the transmission resource 812 is punctured for transmission of URLLC traffic. Similarly, in transmission resource 814 allocated for eMBB UE 1, a sub-portion 818 of the transmission 814 is punctured for transmission of URLLC traffic. The second and third intervals 820, 830 include control information 821, 831, HARQ feedback 823, 833 and transmission resources for transmission of data. A portion 822 of the second interval 820 is a location used for supplementary transmission of the traffic for eMBB UE 1 that was pre-empted from the first scheduling interval 810. This supplementary transmission is an automatic transmission at a predefined or scheduled location in a subsequent frame. This is an example of the first option described above. Although the supplementary transmission illustrated in FIG. 6 is shown as occurring in the second interval 820 immediately subsequent to the first interval 810, it is understood that the supplementary transmission could be any subsequent scheduled interval as long as the interval occurs prior to a time when the HARQ feedback is scheduled for pre-empted data of the first interval. A portion 832 of the third interval 830 is a location used to transmit the traffic for eMBB UE 2 that was pre-empted from the first interval 810. This re-transmission is transmitted in response to receiving a NACK in the HARQ feedback 823, shown here being transmitted at the end of the second interval 820. This is an example of the second option described above. The re-transmission could be a different redundancy version of the pre-empted data from the first frame.

Various techniques can be used to notify a UE that is affected by the pre-emption. As used herein, the term "supplementary transmission" refers to a transmission, based on the pre-empted data, that occurs after an impacted latency tolerant TTU, but before HARQ feedback is provided by a UE. A supplementary transmission can be combined with initial impacted transmission for decoding purposes. HARQ feedback, in the form of an acknowledgment (ACK) or negative acknowledgement (NACK) can be transmitted by the UE after it receives the supplementary transmission. Some techniques involve notifying the UE that a supplementary transmission will occur. Some techniques involve notifying the UE that a pre-emption event has occurred. Some techniques involve notifying the UE of a location where the pre-emption occurred in the impacted scheduling interval so that the UE can determine what portion of the expected traffic was pre-empted. Some techniques may include one or more of the notifications previously identified.

In order to signal the notifications to the UE, there are multiple different mechanisms disclosed herein. Some notifications explicitly define whether a pre-emption has occurred, whether a supplementary transmission has occurred, the location of the pre-emption and the location of the supplementary transmission or re-transmission. Some notifications can be derived by the UE implicitly based on information that is transmitted to the UE. In some implementations, the UE can be pre-configured to expect a supplementary transmission in a predefined location of a subsequent scheduling interval, if a pre-emption occurs and is indicated to the UE.

The signalling of the one or more types of notifications may occur in the same interval as the pre-emption, in a subsequent interval to that of the pre-emption, or a combination of the two locations. In some implementations, the notifications can be transmitted on the Physical Downlink Control Channel (PDCCH), either UE specific or in group common PDCCH.

In one embodiment, UE specific DCI contains pre-emption information and it is sent in the next slot after the impacted eMBB interval. The DCI format used to send the pre-emption information may contain at least Identity, Resource information which contains the pre-emption information, and exclude the otherwise necessary field for regular DL and UL grant. Some padding bits can be added if needed. A flag can be added if the size matches any other DCI format.

Embodiments of multiple different indication signaling techniques and example implementation details are disclosed below.

A first aspect of the disclosure pertains to the relationship between notification of pre-emption of latency tolerant traffic in a first scheduling interval and transmission of a supplementary transmission of the pre-empted latency tolerant traffic in a subsequent scheduling interval. The notification of the pre-emption of traffic can be independent from the supplementary transmission. For example, the notification can indicate that the pre-emption occurred but not define where the supplementary transmission will occur. The supplementary transmission can be sent at a preconfigured location such that the UE knows where to monitor for the supplementary transmission, in which case the UE does not need to be explicitly signaled of the location. The location of the pre-emption event indication can be during or after the impacted TTI. In some implementations, the notification of the supplementary transmission can be transmitted in a common Downlink Control Information (DCI) message, or channel, of a subsequent interval. In some implementations, a new data indicator (NDI) field of the DCI message is used for notifying the UE of the supplementary transmission. If the NDI field is false for the same HARQ process ID and the transmission happens in a subsequent interval, but before the HARQ timeline, the UE determines that the transmission corresponds to the initial impacted transmission. In some implementations, in the notification of the supplementary transmission DCI message a field is included to notify the UE of a re-configured HARQ feedback timing. This allows the base station to extend a previously set HARQ feedback timing so that the UE will allow sufficient time to receive a supplementary transmission if there has been a pre-emption event. Further details will be provided below.

In other implementations, the notification of supplementary transmission signaling can be sent jointly with the pre-emption indication, or may depend on a previous pre-emption indication.

A second aspect of the description provides a process for notifying the UE of a pre-emption event. Part of the process involves sending a notification, which may indicate to the UE one or more of a) whether the eMBB UE is in a coexistence region, b) the HARQ timing configuration for one or more UEs and c) a size of an indication channel. The notification may be sent in a semi-static manner, dynamic implicit manner or a dynamic explicit manner. A further part of the process involves sending a notification of the pre-emption event, if a pre-emption event has occurred. The pre-emption event can be in a same scheduled interval or a subsequent scheduled interval. Further details will be provided below.

A third aspect of the description provides a DCI format for notification of the supplementary transmission. The supplementary transmission may be independently scheduled or sent as part of another grant or part of another transmission block (TB). The DCI can include the location of the supplementary transmission when the supplementary transmission is scheduled as part of another grant or TB. Further details will be provided below.

A fourth aspect of the description provides a format for an indication channel that may provide a pre-emption event indication or a supplementary transmission notification indication, or both. Further detail will be provided below.

In one embodiment, a HARQ timing field in the DCI may implicitly notify the eMBB UE that it may expect pre-emption, specifically if a longer HARQ timeline is signaled.

In a unified indication channel design that includes both the pre-emption event indication and the supplementary transmission notification indication, a length of latency tolerant traffic (i.e. eMBB traffic) scheduling interval is configurable to accommodate the manner in which the traffic is scheduled. Traffic can be scheduled in a slot or slot aggregation format. Therefore, the size of the scheduling format corresponds to the size of the indication channel and the larger the scheduling format, the larger the indication channel. The pre-emption indication can be formed as an aggregation of a basic unit size. In a particular example, 12 resource elements (REs) form a basic unit size that is considered to be a single unit Indication Channel Element (ICE), similar to control channel element (CCE) as used to construct PDCCH. The indication channel can also be formed of an aggregation of multiple ICEs. Individual UEs may support a different number of ICEs for blind detection (BD). In some implementations, a single ICE or an aggregation formation of multiple ICEs can be used to accommodate the length of an eMBB interval being configurable to be different sizes in different intervals. In some implementations, the indication channel information may be scrambled by cell ID. Therefore, eMBB UEs near the edge of a base station serving area can avoid mistakenly reading an indication from a neighbor cell because they are scrambled by the neighboring cell ID. Based on the length of the scheduling interval or aggregation level, eMBB UEs know the search space size that may contain the indication information.

A fifth aspect of the description provides a group common channel design for use in providing a pre-emption event indicator, a supplementary transmission notification indicator, or both. Implementations of the group common channel design may include the use of an Indication Radio Network Temporary Identifier (RNTI), a Group RNTI, or both. In this example, group-common channel design is a channel design for transmission of group-common control signal. The Indication RNTI is a temporary identifier that is used to identify a particular pre-emption event. The indication RNTI is used as part of the group-common control signal so that it is identified by the UEs monitoring the control signal. The group RNTI is a temporary identifier that is used to identify a group of UEs that information is designated for. Further details will be provided below.

The following section describes a combined indication signal design for both the pre-emption event indicator and the supplementary transmission notification indication, for notification during the scheduling interval when a pre-emption event occurs. The indication signal includes at least two UE specific fields. The first field is a single bit field that notifies whether there will be a supplementary transmission. For example, a "0" indicates that there is no supplementary transmission and a "1" indicates that there is a supplementary transmission. A second field is a multi-bit (x bits) field that notifies the UE of a time-frequency location of the pre-emption event within the interval. The value of x depends on a fineness of the granularity for indication within the scheduling interval, i.e. the minimum size transmission interval that can be scheduled within the scheduling interval. Examples of the granularity of the scheduling interval include, but are not limited to, a Code Block (CB), a group of CBs, a symbol, a group of symbols, or a Resource Block Group (RBG).

A UE can determine if there is both a new transmission and a supplementary transmission occurring in a next interval in different resources by detecting an additional 1 bit field in the indication signal during an impacted interval. The additional 1 bit field can notify the UE if there is a grant for the UE in a subsequent interval before the HARQ feedback is to be provided by the UE. The combination of the 1 bit field in the pre-emption indication and the additional 1 bit field identifying the grant for a new transmission for the UE allows the UE to determine what to expect in a subsequent interval.

The following section describes a combined indication signal design for notification of a pre-emption event that occurs in a first scheduling interval and notification of a supplementary transmission that occurs in a second scheduling interval subsequent to the first scheduling interval. Both notifications are transmitted in a control region of a subsequent scheduling interval, as opposed to notification in the same scheduling interval in which the pre-emption event occurred as described above. The pre-emption event indication and supplementary transmission notification indication can be sent together in a group common channel. The pre-emption indication may include a single bit to notify of a supplementary transmission. For example, a "0" indicates that there is no supplementary transmission and a "1" indicates that there is a supplementary transmission. In some implementations, no explicit grant for the supplementary transmission is used. Instead of an explicit grant, if the single bit is set to a value recognized as "true", a supplementary transmission for impacted UEs will be transmitted in a subsequent scheduling interval that is associated with the control region including the indication information. The supplementary transmission may be sent in a same transmission resource of the subsequent scheduling interval as scheduled in the pre-emption event interval or in some other transmission resource which has been pre-arranged.

Figure 7:
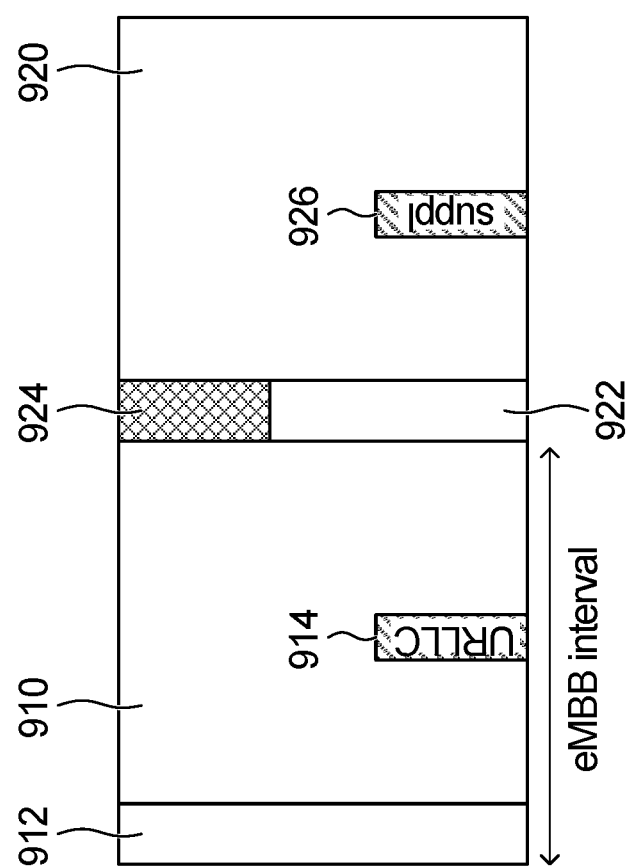
FIG. 7 illustrates an example of two scheduling intervals, each having a control region that can be used to transmit an indication of a pre-emption event according to an aspect of the disclosure.

FIG. 7 illustrates an example of two scheduling intervals 910 & 920, each having a control region 912 & 922. The second control region 922 includes a group common control channel 924 to provide information regarding the pre-emption event indication, the supplementary transmission notification indication, or both. FIG. 7 illustrates the supplementary transmission 926 of data that was originally scheduled in the first frame 910, which was pre-empted by URLLC data 914, using the same resources in the second interval 920 as were intended in the first interval 910.

Other embodiments may include only supplementary transmission information being sent in the group common channel, as opposed to both the pre-emption event indication and the supplementary transmission notification indication being sent together.

In some implementations, locations allocated to the pre-emption indication on the Physical Downlink Control Channel (PDCCH) that are monitored by latency tolerant UEs are pre-configured so the latency tolerant UEs know where to monitor for the pre-emption indication control information. The pre-emption indication control information is allocated at least one location per latency tolerant slot. The particular location of the pre-emption indication control information within the slot is implementation specific.

Figure 8:
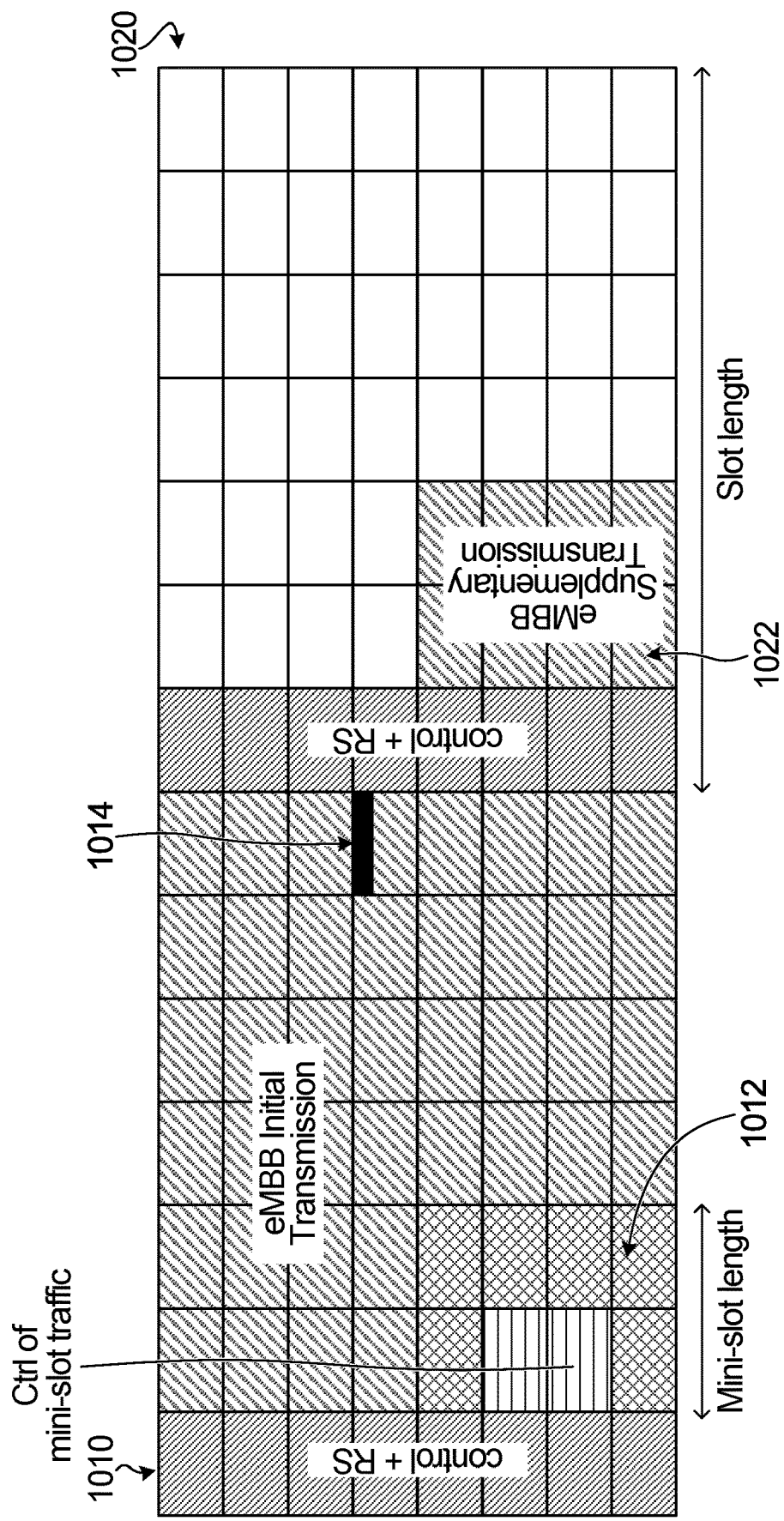
FIG. 8 illustrates an example of pre-emption of a portion of a transmission resource in a first interval and the pre-empted information being scheduled for re-transmission in a subsequent interval according to an aspect of the disclosure.

FIG. 8 illustrates transmission resource 1012, which is a portion of a first scheduling interval 1010 being used for transmission of URLLC traffic. In FIG. 8, the scheduling interval is a slot and the transmission resource 1012 occupies a portion of the slot that is a mini-slot. The URLLC traffic pre-empts the eMBB traffic that would have otherwise been transmitted in transmission resource 1012. The eMBB traffic that was allocated for transmission resource 1012 is instead transmitted as a supplementary transmission in a transmission resource 1022 of a second scheduling interval 1020. The transmission resource 1022 in the second scheduling interval 1020 is located in a same relative position as transmission resource 1012 in the first interval 1010. In FIG. 8, the scheduling interval is 7 symbols long. A first symbol in each interval is for control and reference signals (RS) and the remaining six symbols are for payload. In another embodiment, the first symbol contains a control region and a second symbol contains RS. It is understood that some symbols at the beginning of the slot contain control or RS. Some of the symbols may contain both control and RS. A mini-slot may be two symbols long and thus there are three mini-slots per scheduling interval. FIG. 8 also shows a pre-emption event indication 1014 in the first interval 1010.

Figure 9:
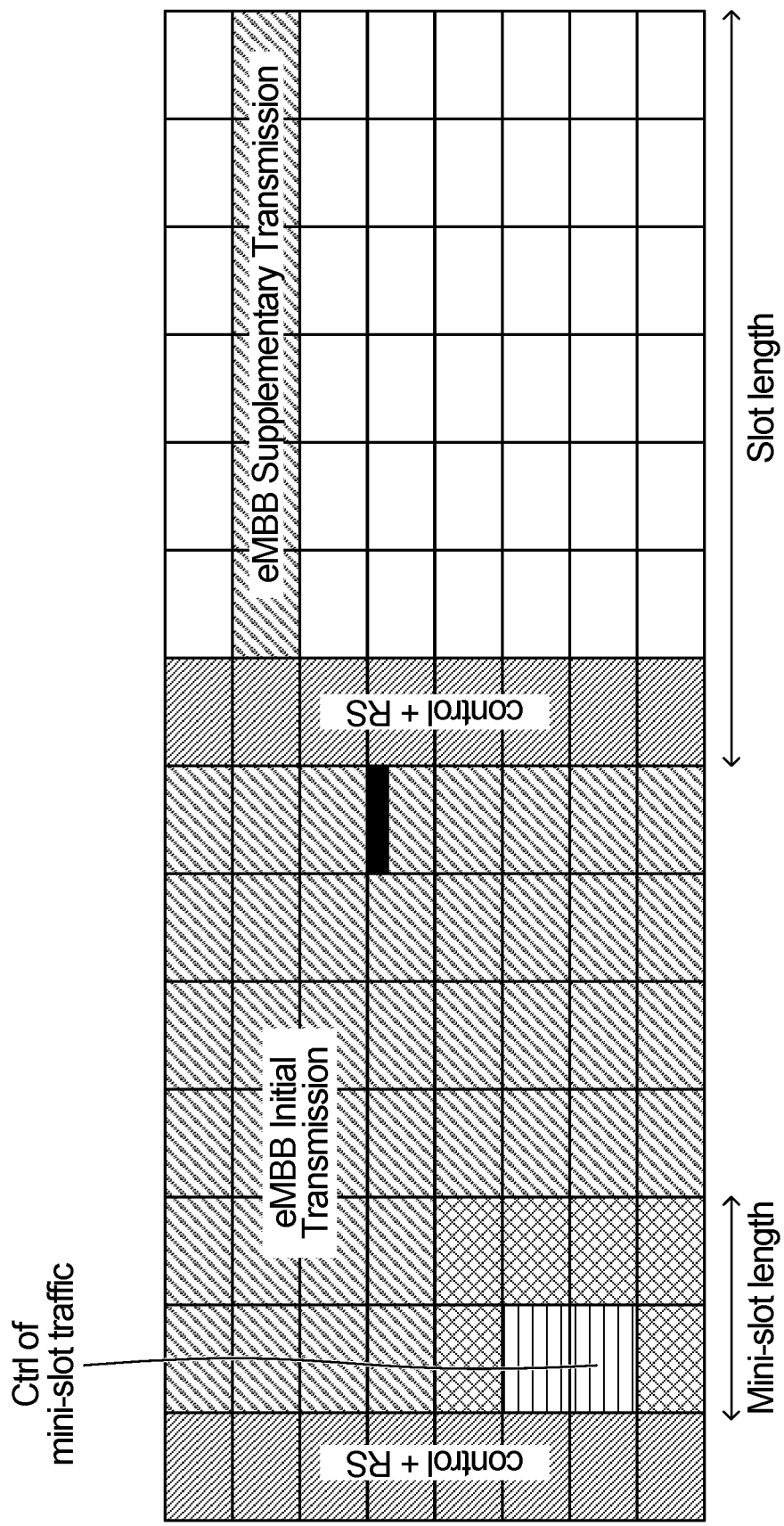
FIG. 9 another example of pre-emption of a portion of a transmission resource in a first interval and the pre-empted information being scheduled for re-transmission in a subsequent interval according to an aspect of the disclosure.

FIG. 9 includes the same first interval as in FIG. 8, but in the second interval, instead of the supplementary transmission being located in a mini-slot in the same location as the pre-empted traffic of the first interval, the supplementary transmission is located over the entire payload portion of the interval on a single sub-carrier.

Figure 10:
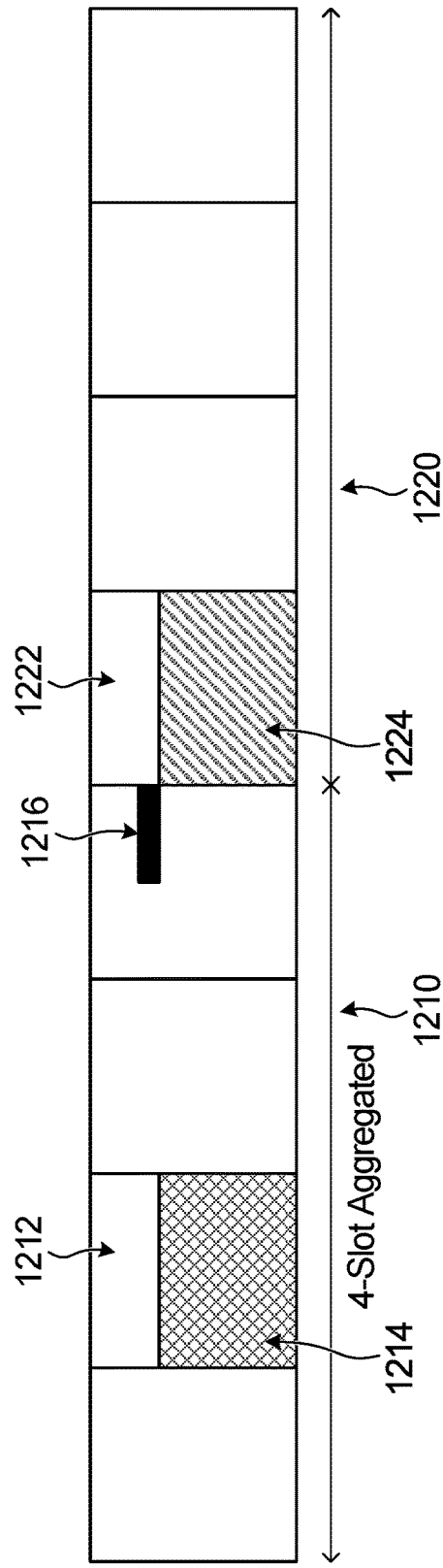
FIG. 10 illustrates yet another example of pre-emption of a portion of a transmission resource in a first interval and the pre-empted information being scheduled for re-transmission in a subsequent interval according to an aspect of the disclosure.

FIG. 10 illustrates an example of a first scheduling interval 1210 that is four slots long and a second scheduling interval 1220 that is also four slots long. A transmission resource portion 1214 of the second slot 1212 of the first interval 1210 is pre-empted. The latency tolerant traffic that was scheduled to be transmitted in the second slot 1212 of the first interval 1210 is transmitted in a transmission resource portion 1224 of the first slot 1222 of the second interval 1220. FIG. 10 also shows a pre-emption event indication 1216 in the first interval 1210.

UE Behavior for Supplementary Transmission

When the UE receives the supplementary transmission, there are various ways in which the UE can process the data received from a previous scheduling interval that was impacted by pre-emption and the supplementary transmission.

When the supplementary transmission occurs only a short duration after the initial impacted transmission, the UE can use the data in the supplementary transmission to decode a combination of data in the initial impacted transmission, except for the data of the punctured location, and the data in the supplementary transmission.

If the amount of pre-empted data is small, the supplementary transmission may span a mini-slot duration or one slot duration, depending on whether the initial transmission is slot-based or an aggregation of slots.

In some implementations, when the size of the supplementary transmission exceeds a certain threshold, the UE will consider the supplementary transmission as a partial re-transmission. The UE combines data in the initial impacted transmission, except for the data of the punctured location, with the data in the partial re-transmission and then attempts to decode the combined data. After the UE combines the initial transmission and partial re-transmission and attempts to decode the data, the UE generates HARQ feedback.

In some implementations, when data is pre-empted in a first interval and a supplementary transmission is sent in a second interval, HARQ feedback is delayed by at least one slot to allow the UE an opportunity to receive and attempt to decode the supplementary transmission before the HARQ feedback is generated. The base station may send updated HARQ timing configuration information in the UE specific DCI to notify the UE to delay the normal HARQ feedback timing. If the HARQ feedback is scheduled with a sufficient time to allow the UE to receive the supplementary transmission, the configured HARQ timing may not be impacted. Latency tolerant UEs, if scheduled in a time-frequency resource where low latency traffic is expected, may be signaled a longer HARQ feedback timing duration in a field in the DCI.

In some implementations, the UE can be notified using higher layer signaling to indicate whether the UE should delay the HARQ feedback to allow time for a supplementary transmission.

DCI Based Indication Design

In some implementations, the pre-emption event indication is transmitted during the impacted eMBB TTI and a DCI containing information regarding the supplementary transmission, or a re-transmission, is transmitted in a subsequent eMBB TTI. A supplementary transmission is a transmission of data that was pre-empted from an earlier interval but occurs before HARQ feedback signaling. A re-transmission is a transmission of data from an earlier interval that was not successfully decoded and is initiated based on HARQ feedback signaling. The NDI field of the DCI may be used to indicate a supplementary transmission. If the NDI field is false for a same HARQ Process ID as for the initial transmission, it can indicate a supplementary transmission related to the impacted eMBB transmission. The HARQ Process ID is used to identify data when multiple parallel re-transmissions are occurring. When the supplementary transmission or retransmission is received, the UE can then combine the supplementary transmission with the initial transmission, or attempt to decode the re-transmission, and send an ACK or NACK based on whether the transmission has been successfully decoded.

In another particular implementation, the pre-emption event indication and information pertaining to the supplementary transmission, if any, are both notified via DCI.

In some embodiments, a process for notifying the indication and supplementary transmission can be adopted using both a region common to multiple UEs and a UE specific region. A common region in the DCI can be used to send multicast information to multiple UEs pertaining to pre-emption puncturing. The UE specific region contains at least one field, for example the NDI, that can be used to notify the UEs whether there is a supplementary transmission or not. A common DCI is used to send a pre-emption indication to a group of UEs. A UE specific DCI is used to notify individual UEs in the group of their supplementary transmissions. The UE specific DCI can be sent either in the same interval where the pre-emption indication is sent or in a subsequent interval.

The pre-emption event indication and supplementary transmission notification indication can be sent in a same control region or different control regions. For example, if transmitted in different control regions, the pre-emption event indication may be transmitted in a first control region and the supplementary transmission notification indication may be transmitted in a subsequent control region. The first and second control regions could be in the same scheduling interval or different scheduling intervals.

PHICH-Like Design for Supplementary Transmission

A new channel is proposed for indicating supplementary transmission from the base station to UEs that the base station is serving. The new channel may be referred to as a "Physical Supplementary Transmission Indication Channel (PSICH)".

A one bit field is used in each Transmission Block (TB) to signal the occurrence of a supplementary transmission.

In some embodiments, several PSICHs can be code multiplexed. Furthermore, in some embodiments, the code multiplexed PSICHs can then be scrambled using a hyper-cell sequence. One PSICH region may be used for multiple TBs. The format of the PSICH may adopt similar features as PHICH channel.

This approach can be adopted for non-adaptive supplementary transmission. For a non-adaptive supplementary transmission, the same configuration for transmission of the supplementary transmission is used as would have been used to send the coded bits if they had not been pre-empted. In some embodiments, this means that the same MCS and resource allocation are used for the supplementary transmission as was intended to be used for the traffic that was pre-empted. In some embodiments, parameters such as MCS are the same, but the resource allocation could be a pre-configured location.

DCI Based Design Details

A supplementary transmission of pre-empted data from a previous scheduling interval may occur within a same scheduling interval as another grant. According to some aspects of the present application there is provided a process having a low overhead that enables an eMBB UE that is impacted by a pre-emption event to know where to locate the supplementary transmission of data in a subsequent scheduling interval that was pre-empted in a previous scheduling interval.

A supplementary transmission can be transmitted 1) immediately after the control region or 2) at a same location where pre-emption occurred in a subsequent interval.

Figure 11:
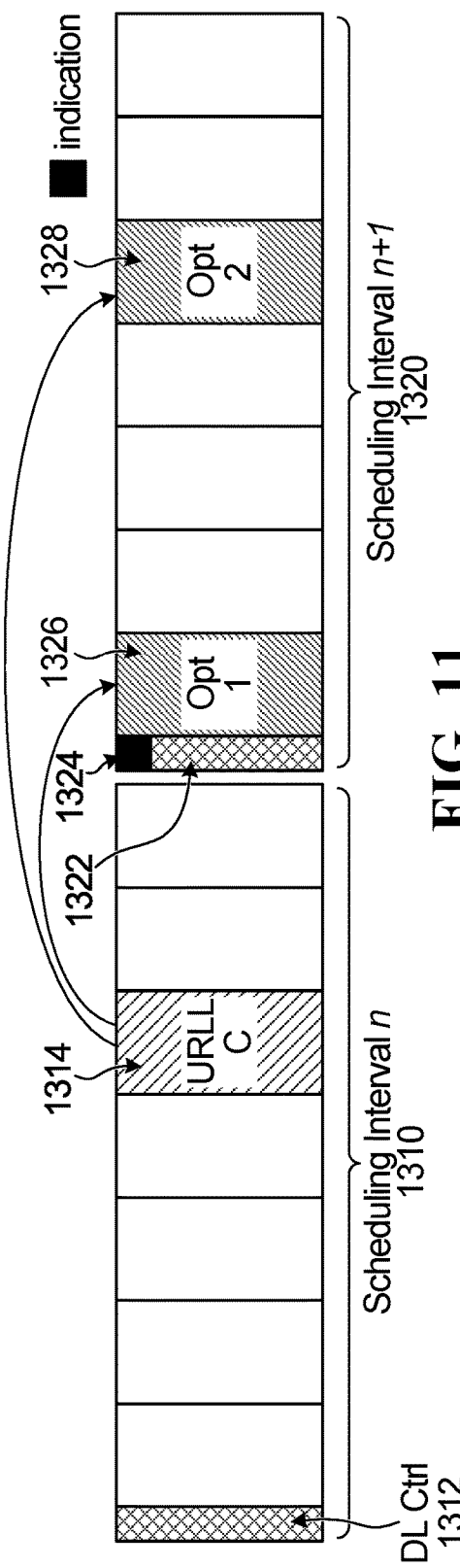
FIG. 11 illustrates a further example of pre-emption of a portion of a transmission resource in a first interval and the pre-empted information being scheduled for re-transmission in a subsequent interval according to an aspect of the disclosure.

FIG. 11 illustrates two consecutive scheduling intervals 1310 and 1320. There is a DownLink (DL) control portion 1312, 1322 at the beginning of each interval 1310, 1320. In the first interval 1310, URLLC data 1314 pre-empts a portion of eMBB data that was scheduled for particular transmission resource. The DL control information 1322 of the second interval 1320 includes an indication 1324, which is a pre-emption event indication or a supplementary transmission notification indication, or both. In the second interval 1320, examples of two locations for supplementary transmission are illustrated. With regard to a first example, the pre-empted eMBB data is shown to be scheduled for supplementary transmission at a location 1326 directly after the DL control information 1322 containing the indication for the second interval 1320. With regard to a second example, the pre-empted eMBB data is shown to be scheduled for supplementary transmission at a location 1328 that is at the same location in the second interval 1320 as where the eMBB data was originally scheduled in the first interval 1310.

A pre-configured arrangement of the location of the supplementary transmission to be used by the base station, which is known by the UE, avoids the use of further signaling to explicitly define the location of the supplementary transmission is in the new TB.

Notifying UEs of the pre-configured location of the supplementary transmission can be done using either implicit or explicit signaling. An example of implicit signaling occurs when the indication notifies the UE of an amount of a scheduling interval that has been pre-empted for transmission of low latency traffic. If the amount of pre-empted data exceeds a threshold, the UE infers that a supplementary transmission will be transmitted in a pre-configured location known to the UE. This location could be configured semi-statically and maintained until a notification is signaled to change to a different pre-configured location. The notification of a change in the pre-configured location used to send supplementary transmission can be sent via higher layer signaling. A first non-limiting example of a location for a pre-configured resource for the supplementary transmission is immediately after the control region of a subsequent scheduling interval. A second non-limiting example of a location for a pre-configured resource for the supplementary transmission is at a same relative location in a subsequent scheduling interval as the location of pre-empted data in the original scheduling interval.

Explicit signaling may involve using a 1 bit field in a UE specific region in a similar fashion as used in an NDI field that defines two options for the location. For example, if the 1 bit field is "0" then the supplementary transmission is located immediately after the control region of a subsequent scheduling interval and if the 1 bit field is "1" then the supplementary transmission is located at the same location in a subsequent scheduling interval as the pre-empted data from the original scheduling interval.

Described below are two examples of the DCI format and how they could be used.

The first example involves scheduling the supplementary transmission independently from other data. In some implementations, the DCI may use similar fields to that of regular LTE DCI formats. The DCI for supplementary transmissions may not require all fields that typically are included in a regular DL grant. In some implementations, the DCI may include fields such as, but not limited to, a resource allocation, a HARQ ID-like field, an identity field, an MCS field and a redundancy version (RV) field. The resource allocation field defines the transmission resource for the supplementary transmission. The HARQ ID-like field links a supplementary transmission to an original transmission. The identity field defines the UE that the PDCCH is intended for. The MCS field defines the modulation and coding scheme used for the supplementary response. The RV field defines the amount of redundancy added into the supplementary transmission while channel encoding. It is understood that the proposed compact DCI format may include some additional fields as necessary for proper reception of the PDCCH. For example, the DCI format may use a flag to notify the DCI type, in case it is of the same size of another DCI format. It may also include padding bits, if necessary, so that it can match some of the chosen DCI sizes.

Whether an impacted UE treats a transmission in a subsequent scheduling interval as a re-transmission (i.e. the UE will not use as part of an initial decoding) or a supplementary transmission (i.e. the UE will use as part of the initial decoding) may be a function of the TB size scheduled or the size of the pre-emption event, or both.

If the latency tolerant UE is scheduled in a time-frequency resource where low latency traffic is expected, the UE can be configured or signaled to have a longer HARQ feedback timing duration so that the UE can combine the initial transmission and the supplementary transmission, and produce an ACK/NACK afterwards.

The UE follows configured or signaled HARQ timing that defines how many TTIs the UE waits before sending HARQ feedback.

The second example involves the supplementary transmission being scheduled together with other new data. In some implementations, the DCI may use similar fields to that of regular LTE DCI formats. Examples of how to distinguish the supplementary transmission from new data may include using a different HARQ process number for each of the supplementary transmission and the new data or using an NDI bit that when "true" identifies a supplementary transmission.

In some implementations, a single bit field is used as a flag to identify that there is a supplementary transmission. If this flag is "true" meaning that there is a supplementary transmission, the UE proceeds to determine the size of the supplementary transmission based on the UE's knowledge of the size of a subsequent scheduling interval and the size of new data in the subsequent scheduling interval. The difference between the size of the subsequent scheduling interval and the size of the new data in the subsequent scheduling interval is the supplementary transmission size.

According to an aspect of the application, another process is provided for sending a pre-emption event indication. In some implementations, as described above, a transmission resource may include an eMBB only region and a coexistence region that may be predominantly for eMBB traffic, but URLLC traffic can be scheduled in the coexistence region as necessary. A first step may involve the base station signaling an indication of whether an eMBB UE is scheduled for transmission in the eMBB only region or in the coexistence region. If the UE is scheduled only in the eMBB region the UE does not monitor for potential indications of pre-empted data.

The first step of signaling the indication could involve signaling in a UE specific manner such that UEs are signaled individually; or in a UE-group based manner such that multiple UEs are signaled collectively. When signaled in the UE-group based manner, any UEs scheduled for transmission in the eMBB only region could be signaled as a first group and UEs scheduled for transmission in the coexistence region could be signaled as a second group.

The signaling could be implicit or explicit. The explicit signaling could further be either semi-static or dynamic. Semi-static signaling can be sent via RRC signaling or system information. Dynamic signaling can be sent via UE specific or group common DCI or any other configured control channel in the data region.

A second step, taking place after the first step, involves sending the pre-emption event indication.

The second step of signaling the pre-emption event indication can be performed in the impacted TTI or a subsequent TTI.

The signaling of the first step in the DCI can also let UEs know the configured HARQ timing used to support supplementary transmission. For example, in the case of a single bit being sent in the first step, a "1" may indicate that the UE should use delayed HARQ timing (i.e. a delayed ACK/NACK) if the second step occurs and a "0" may indicate a default where there is no change to the default HARQ feedback timing.

Using this process to signal the indication may lower the complexity of certain processes that are performed by the UE due to the lower overhead and simplicity of what is being transmitted. In a situation in which the UE is scheduled in a latency tolerant region only, not a coexistence region, and notified as such by the first indication, no second indication needs to be sent, thus reducing overhead and resulting in the fact that the UE does not have to monitor for the second indication. The process may also reduce the number of blind detection (BD) attempts by the UE. For example, if the first indication notifies the UE that the UE is scheduled in a latency tolerant region only, not a coexistence region, the UE does not need to perform BD as part of monitoring for notifications of a pre-emption event that may occur in the coexistence region.

Figure 12:
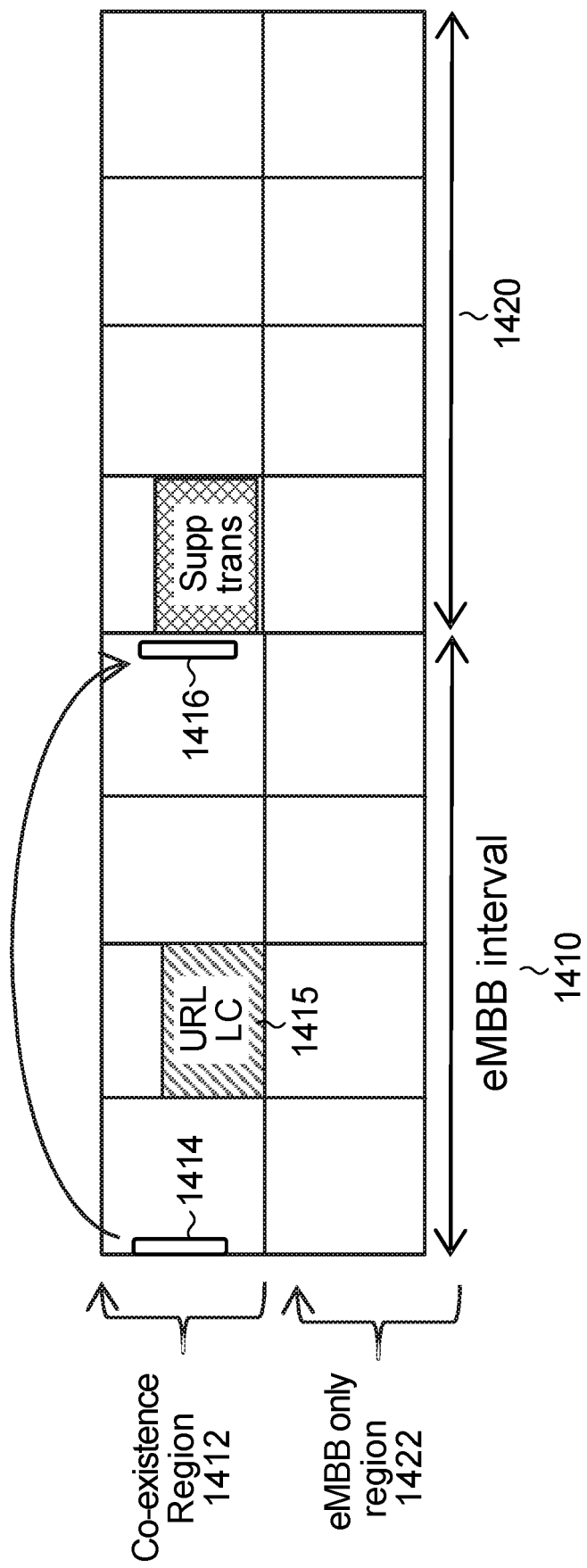
FIG. 12 illustrates an example of pre-emption of a portion of a transmission resource in a first interval and an indication of the pre-empted event being sent in the same interval according to an aspect of the disclosure.

FIG. 12 illustrates two scheduling intervals 1410 and 1420. Each interval includes a coexistence region 1412 and an eMBB traffic only region 1422. Near the beginning of the first interval 1410 there is an indication 1414 in the coexistence region 1412 for any UEs scheduled in the coexistence region 1412. Transmission of indication 1414 is representative of the first step described above that involves the base station signaling an indication of whether an eMBB UE is scheduled for transmission in the eMBB only region or in the coexistence region. Near the end of the first interval 1410 there is an indication 1416 in the coexistence region 1412 to one or more UEs scheduled in the coexistence region that some of the data has been pre-empted in the first interval 1410 as a result of the URLLC traffic 1415. Transmission of indication 1416 is representative of the second step of signaling the pre-emption event indication. The indication at the end of the first interval might be a UE specific indication to the one or more UEs that are affected by the pre-emption or might be a Group based indication to notify all UEs in the coexistence region that there is a supplementary transmission that the UEs can expect in a subsequent interval.

Unified Indication Design

Transmissions of eMBB data to a UE can use a single slot or an aggregation of slots. As a result of the configurability of the eMBB data size, time domain information in the indication can vary in size. Another aspect of the present application provides a configurable indication channel for use during the impacted TTI. The configurable indication channel may enable a unified design that addresses the variability of the eMBB data size.

The signaling to the UEs can identify the size of the indication channel. The signaling can be implicit or explicit. The explicit signaling can further be semi-static or dynamic in nature.

In a situation when an eMBB DCI sent by the base station notifies the UE of the number of slots that the UE data is aggregated over, the indication channel size is implicitly assumed by the UE as will be described below.

The indication channel is formed as an aggregation of basic units. In a particular example, one Indication Channel Element (ICE) corresponds to N Resource Elements (REs), which could be considered as one Resource Element Group (REG). A longer interval may require an indication channel size to have a larger capacity to accurately capture pre-emption event information because there is more capacity for pre-emption events to occur.

In some scenarios, rules may be applied for generating an indication channel. For example, for a situation when 1≤x<N URLLC scheduling intervals occur within an eMBB interval, where x is an actual number of URLLC granularity contained within the eMBB interval and N is a predetermined constant relating to a granularity of the signaling, the indication channel size may be 1 ICE. Then, when N≤x<2N URLLC discrete transmission resources occur within the eMBB interval, the indication channel size may be 2 ICE, and so on. The ICE may have the same structure or size as a CCE.

Group-Common Control Channel

One manner of implementing a group-common control channel for providing the indication for the pre-emption event, the supplementary notification event, or both, involves a given base station using a group common Physical Downink Control Channel (PDCCH). The group common PDCCH including the indication can be detected by the UE using an Indication Radio Network Temporary Identifier (RNTI) or any other group identifier which relates to pre-emption of latency tolerant TTUs.

Pre-emption information sent using a group common PDCCH can be conveyed in a number of different ways. One option is sending information of low latency pre-emption events to a group of latency tolerant UEs. Alternatively, pre-emption information can be sent in a UE-specific manner in the common message. Details of these options are provided below.

Affected UEs can be notified of URLLC pre-emption events occurring in a previous scheduling interval to that of the scheduling interval including the group common PDCCH. The base station may limit the number of pre-emption events that can occur over in an interval. The indication portion of the group common control PDCCH may then be divided into a number of fields that is equal to the maximum number of pre-emption events that could occur. Each field could then be used to transmit information pertaining to a respective pre-emption event. Each field may contain the time-frequency resource information of each pre-emption event. The granularity of time and frequency information is configurable. For example, configurability in the time domain may include a URLLC slot/mini-slot index and configurability in the frequency domain may be in the form of RBs or RBG.

In some implementations, eMBB UEs can be notified by the serving base station of pre-emption events that pertain to them specifically. There may be a maximum number of UEs that are supported in each scheduling interval. For each UE there may be a respective field that allows the UE to be notified of any portion of the UE's scheduled resource that has been pre-empted. Each field can have a different granularity of indication. The granularity may be limited to indicating time only, frequency only, or both time and frequency. The granularity of time and frequency information is configurable. For example, a symbol group or mini-slot in time and RBs or RBG or sub-band in frequency.

Figure 13:
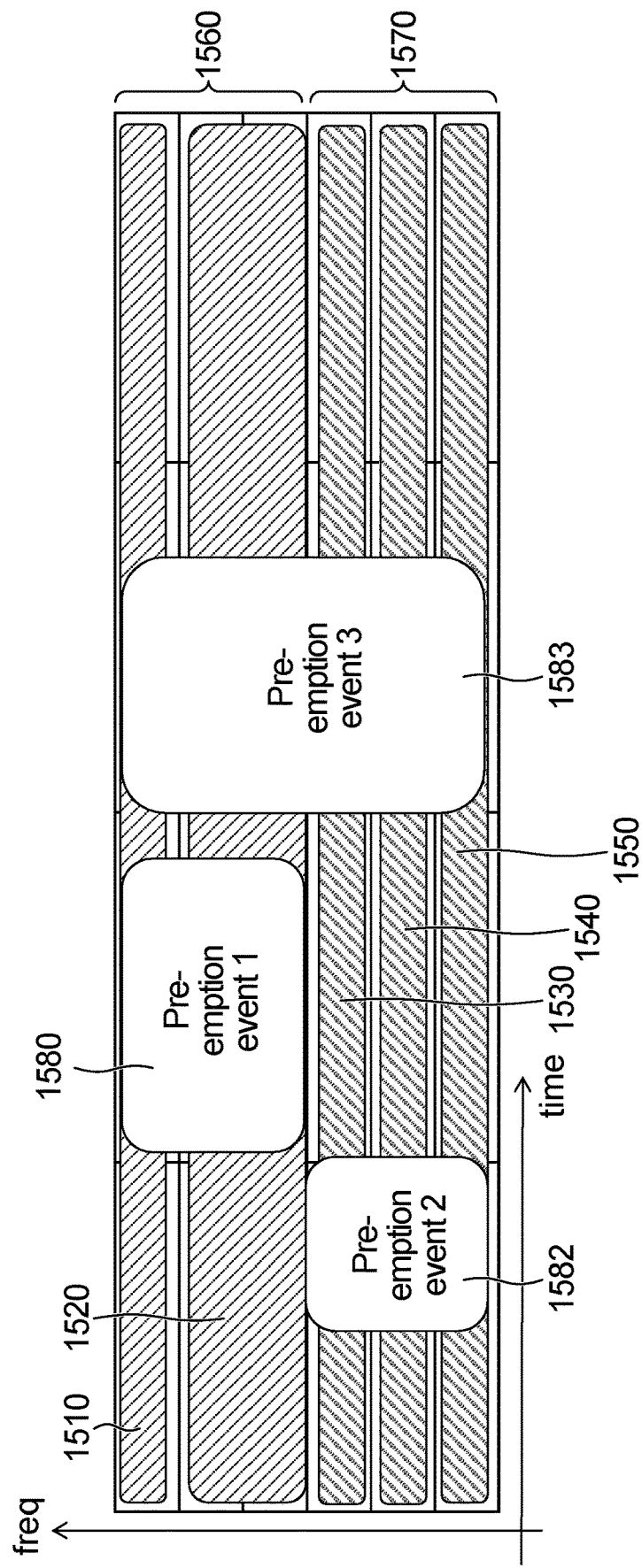
FIG. 13 illustrates an example of multiple pre-emption events occurring within a transmission bandwidth divided in a Frequency Division Multiplexing (FDM) fashion according to an aspect of the disclosure.

FIG. 13 illustrates a time-frequency resource interval divided in an FDM fashion. Here, by FDM division, it is meant that resources are scheduled to UEs in FDM fashion at the beginning of the interval. A first bandwidth 1510 is allocated for a first UE. A second bandwidth 1520 is allocated for a second UE. A third bandwidth 1530 is allocated for a third UE. A fourth bandwidth 1540 is allocated for a fourth UE. A fifth bandwidth 1550 is allocated for a fifth UE. The first and second bandwidths 1510 & 1520 are considered to be a first bandwidth part 1560 for a first group of UEs including the first and second UEs and the third, fourth and fifth bandwidths 1530, 1540 & 1550 are considered to be a second bandwidth part 1570 for a second group of UEs including the third, fourth and fifth UEs. Therefore, indications that are to be send to the first and second UEs can be scrambled using a Group ID of the first group of UEs and indications that are to be send to the third, fourth and fifth UEs can be scrambled using a Group ID of the second group of UEs. In the case of FIG. 13, a first pre-emption event 1580 occurs in a resource scheduled for UEs 1 and 2, a second pre-emption event 1582 occurs in a resource scheduled for UEs 3, 4 and 5, and a third pre-emption event 1584 occurs in a resource scheduled for UEs 1, 2, 3, 4 and 5. The group ID or RNTI is formed based on a bandwidth partition. In this example, for each bandwidth part 1560 and 1570, one indication is sent which is monitored by the group of UEs scheduled within the bandwidth part. Each indication is scrambled by an ID or RNTI. A latency tolerant transmission belonging to one or more bandwidth partitions can be monitored using the group common message intended for the one or more bandwidth partitions.

In a particular example, a pre-emption indication portion of a group common PDCCH is used for pre-emption event indication. This portion has one indication field corresponding to each of a maximum permitted number of URLLC pre-emption events. If there are three pre-emption events, the first three indication fields would include information to notify the affected UEs, or groups of UEs, of each of the three pre-emption events. In the particular example, the pre-emption location portion of the group common PDCCH has one indication field corresponding to each of a maximum number of active UEs being served by the base station. Using the group common PDCCH to notify five affected latency tolerant UEs of the respective pre-emption events that affect them as described above, the first five fields would include information to notify each of the five UEs, respectively, of the pre-emption events that pertain to them. In the particular example, the pre-emption indication portion of a group common PDCCH has ten fields and the pre-emption location portion of the group common PDCCH has ten fields, but it is to be understood that the sizes of the fields are implementation specific and could be larger or smaller than 10 fields.

A mapping function may be used to indicate the relation between the group common channel message field and the allocated UE. One example mapping function is mod (i, L), where i is the starting RB index of an UE and L is the total number of UEs. Because there could be ambiguity if for multiple UEs the mod(i, L) result is a same value, an offset field can be indicated as well. The network can use the offset field to avoid overlap. Offset value will be different to resolve ambiguity. For example, "mod(i, L)+offset" may give the location of the field for the UE for which i is the first RB index.

Alternatively, instead of an explicit offset field, a combination of different existing fields in the DCI may implicitly indicate the offset.

Figure 14:
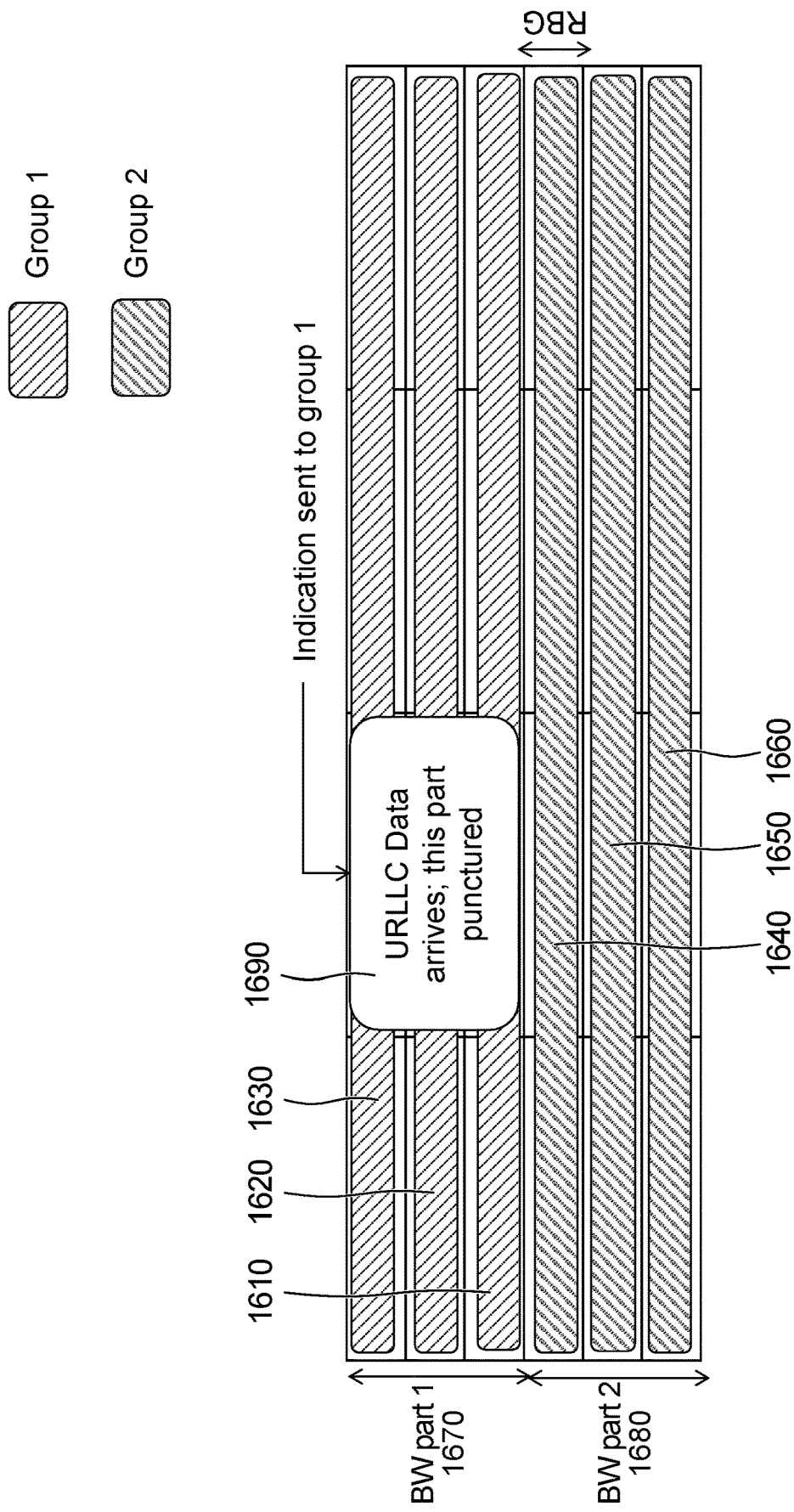
FIG. 14 illustrates an example of a single pre-emption event occurring over within a transmission bandwidth divided in a Frequency Division Multiplexing (FDM) fashion according to an aspect of the disclosure.

Another manner of implementing a group common control channel for providing the indication involves one or more serving base stations using multiple group common PDCCHs, each including an indication that can be detected by using a group RNTI. Note that group RNTI is used in a general context that the RNTI is used by a group of UEs. In the context of the examples, the RNTI used for a transmitting indication, i.e., indication RNTI is a group RNTI where a group of UEs use the RNTI to identify the PDCCH when it is transmitted. Different common PDCCH can be sent based on the division of transmission resources. FIG. 14 illustrates a time-frequency resource interval in which the resource is divided in a FDM fashion. A first bandwidth 1610 is allocated for a first UE. A second bandwidth 1620 is allocated for a second UE. A third bandwidth 1630 is allocated for a third UE. A fourth bandwidth 1640 is allocated for a fourth UE. A fifth bandwidth 1650 is allocated for a fifth UE. A sixth bandwidth 1660 is allocated for a sixth UE. The first, second and third bandwidths 1610, 1620 & 1630 are considered to be a first bandwidth part 1670 for a first group of UEs including the first, second and third UEs and the fourth, fifth and sixth bandwidths 1640, 1650 and 1660 are considered to be a second bandwidth part 1680 for a second group of UEs including the fourth, fifth and sixth UEs. In the case of FIG. 14, a first pre-emption event 1690 occurs in a resource scheduled for the first, second and third UEs. In this case a single group common PDCCH is used to notify all of the UEs of the first group of UEs of the URLLC preemption event. If there had been a second pre-emption event in the resources used by any of the second group of UEs, a second common group PDCCH would be sent notifying the second group of UEs. The capacity of the group common PDCCH is limited and therefore, it may be advantageous to minimize the size of the portion of the group common PDCCH used for transmission of the indication. As compared to the example above where the pre-emption event location portion of the group common PDCCH has ten fields corresponding to a maximum number of active UEs being served by the base station, if there are only five active UEs, the additional five fields are wasted overhead. Furthermore, if only two of the five active UEs need to be notified of a pre-emption event, then it would be more efficient (i.e. less wasted overhead) to only populate and send two fields to notify the two affected UEs.

Therefore, in order to use the group common PDCCH efficiently, a single bit may be sent during an impacted scheduling interval to notify pre-emption affected eMBB UEs to monitor the group common PDCCH to determine how the UEs are affected, which would allow the group common PDCCH to be smaller by needing to provide information to only the affected UEs. This can be useful when the group common PDCCH has a small number of fields. Similar as described above, a starting RB index and/or offset can be used to implicitly notify the UE which field to access in the group common PDCCH.

In one example, one group common PDCCH can be sent which can have M fields corresponding to time granularity of URLLC traffic or a group of symbols, each of those M fields can be further sub-divided into N fields, which contain frequency domain pre-emption information for each time domain granularity or field. eMBB UEs that transmitted in the previous slot monitor this in the next slot. In another example, one group common PDCCH can be sent for each time granularity of URLLC traffic or a group of symbols. Inside the common PDCCH, there can be N fields where each field contains sub-band or RBG based frequency domain pre-emption information.

Figure 15:
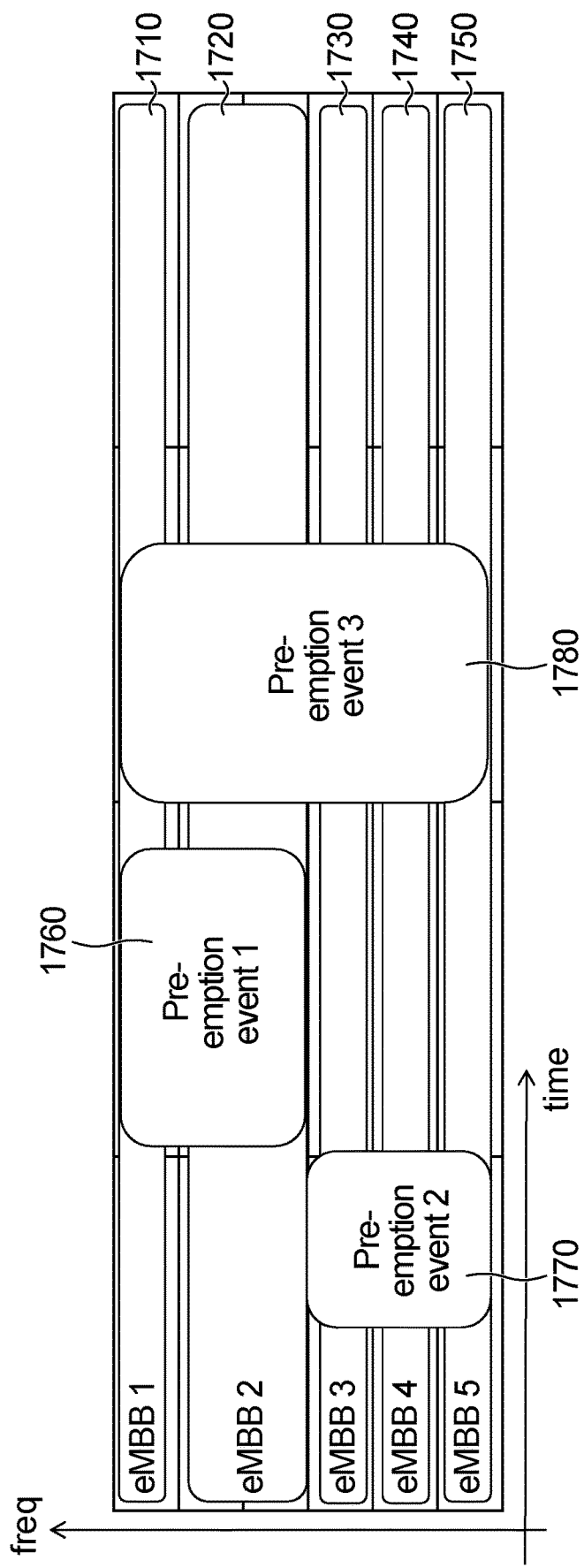
FIG. 15 illustrates another example of multiple pre-emption events occurring within a transmission bandwidth divided in a Frequency Division Multiplexing (FDM) fashion according to an aspect of the disclosure.

FIG. 15 illustrates a time-frequency resource interval in which the resource is divided up in an FDM fashion. A first bandwidth 1710 is allocated for a first UE. A second bandwidth 1720 is allocated for a second UE. A third bandwidth 1730 is allocated for a third UE. A fourth bandwidth 1740 is allocated for a fourth UE. A fifth bandwidth 1750 is allocated for a fifth UE. In the case of FIG. 15, a first pre-emption event 1760 occurs in a resource scheduled for the first and second UEs, a second pre-emption event 1770 occurs in a resource scheduled for third, fourth and fifth UEs, and a third pre-emption event 1780 occurs in a resource scheduled for first, second, third, fourth and fifth UEs. A bit map having a single bit allocated to each UE can be sent during the scheduling interval to indicate to each of the respective UEs whether there is at least one pre-emption event. Then the group common control indicator can be used after the scheduling interval to provide additional information, such as the location of the pre-emption event.

Although reference has been made to eMBB and URLLC traffic types in the description above, in particular with regard to FIGS. 6 to 15, more generally these traffic types could correspond to other latency tolerant traffic and low latency traffic types.

For an eMBB slot interval containing M mini-slots, there may be as many as M group RNTIs, i.e. one group RNTI in each of the M mini-slots, that can be used to aid in communication of pre-emption information between the base station and multiple UEs. The group message associated with a mini-slot provides frequency domain pre-emption information during that mini-slot. The base station can notify UEs of frequency domain pre-emption information using the group common PDCCH and the group RNTI associated with the mini-slots. eMBB UEs monitor the group messages associated with the mini-slots. Group messages corresponding to a mini-slot are sent if there is at least one pre-emption event that has occurred during the mini-slot. The granularity of the frequency domain pre-emption information is configurable. In another embodiment, a group message can be sent for a group of mini-slots or slots, instead of every mini-slot, to convey pre-emption information.

The pre-emption indication, if sent during the impacted interval, can be constructed as a sequence that may or may not include RS in it. If the pre-emption indication is UE specific and sent anywhere in the bandwidth of the latency tolerant transmission block, then the RS of the latency tolerant transmission block can be used to decode the indication information. If the indication is sent in a time-frequency resource outside the bandwidth of a latency tolerant transmission, for example when a broadcast/multi-cast indication is sent, the indication sequence may or may not include RS. If it includes RS, the UEs can decode the indication in a coherent manner, otherwise the UEs perform non-coherent detection of the indication sequence.

Figure 20:
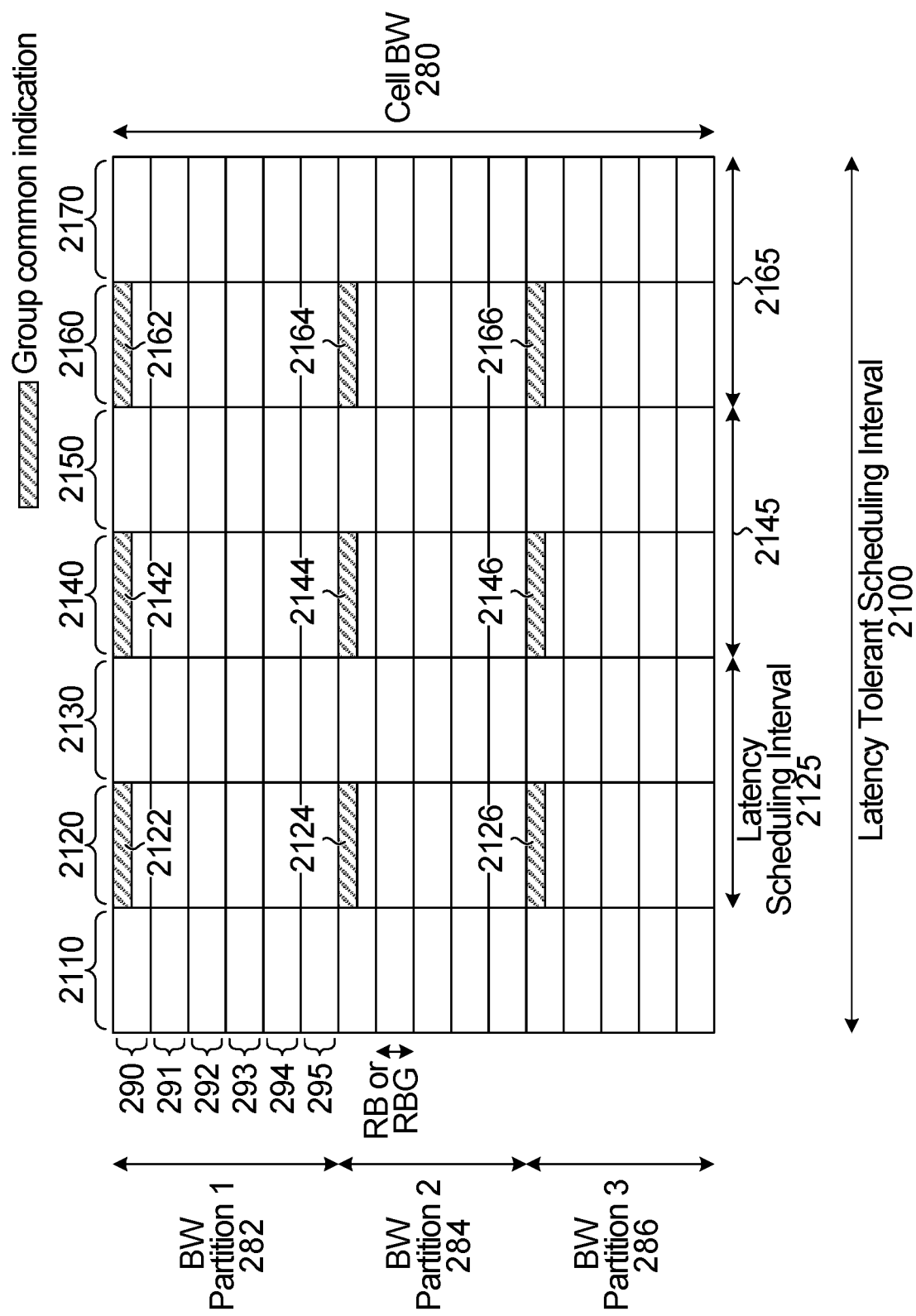
FIG. 20 illustrates an example of group common indication signaling in a latency tolerant scheduling interval according to an aspect of the present application.

A latency tolerant scheduling interval may contain multiple low latency scheduling intervals which can be based on a mini-slot or slot granularity. FIG. 20 illustrates an example of a latency tolerant scheduling interval 2100 having the duration of 7 symbols 2110, 2120, 2130, 2140, 2150, 2160, 2170. The bandwidth 280 is divided into three bandwidth partitions 282, 284, 286. Each bandwidth partition is subdivided in multiple resource blocks (RBs) or resource block groups (RBG) that include multiple resource blocks. The first bandwidth partition 282 includes RBs 290, 291, 292, 293, 294, 295. A first low latency scheduling interval 2125, based on a mini-slot, has the duration of two symbols 2120 and 2130. Second and third low latency scheduling intervals 2145 and 2165 also have two symbol durations. For each low latency scheduling interval, one or multiple group common indications are sent. Group common indications 2122, 2124, 2126 are sent in the first low latency scheduling interval 2125. Group common indications 2142, 2144, 2146 are sent in the second low latency scheduling interval 2145. Group common indications 2162, 2164, 2166 are sent in the third low latency scheduling interval 2165. If one group common indication is sent every low latency interval, then the indication is broadcast to all latency tolerant UEs and the UEs monitor the common indication in a dedicated search space, in one or more symbols of the low latency scheduling interval. The group common indication contains M bits to convey frequency domain pre-emption information during the low latency interval. For example, if M is 8 bits then the bandwidth is partitioned into eight sub-bands. The latency tolerant UEs monitor the 8-bit bitmap contained in the broadcast message and if their transmissions overlap with the sub-bands that are partially or fully pre-empted, the UEs clear a buffer that contains data received during the duration of the low latency scheduling interval. The UE resumes data reception after the low latency interval finishes. If the bandwidth is large or the UE bandwidth capability is limited, or both, the whole transmission bandwidth can be partitioned and for each partition a group common message can be sent during the low latency scheduling interval. Group common messages for each partition can have an N-bit bitmap to notify frequency domain pre-emption information over the partition or sub-band. For example, if there are three BW partitions configured, then there would be three group common messages sent every low latency interval. The search spaces may be reserved or blindly detected. In a particular example, if no pre-emption event occurs in bandwidth partition 1 282 during a low latency scheduling interval, the group common message is not sent for that bandwidth partition. A search space that is not used for signaling a pre-emption event can be used to transmit downlink data. The number of bits that constitute the bitmap to convey frequency domain pre-emption information within a group common message is configurable. There can be a set of values of a number of bits chosen by higher layer. The latency tolerant UEs can be signaled via system information or via dedicated RRC signaling the configuration that is to be used. The configuration may include how many bits or how the bandwidth is partitioned to send a frequency domain indication. The latency tolerant UEs can be also be notified via higher layer signaling whether there are one multiple group common message over the BW to convey pre-emption information. Same group common information discussed here can be sent in a group common PDCCH.

In another embodiment, a group common indication can be sent in a symbol before the low latency scheduling interval. If one or more BS already has the scheduling information of low latency traffic available, at least one symbol before the low latency interval begins, then the symbol preceding the low latency scheduling interval can be used to send the pre-emption indication. In such a scenario, the latency tolerant UEs will not have to buffer any data during the next low latency scheduling interval. If the indication is sent in the first symbol of the low latency interval, the latency tolerant UEs would at least buffer the first symbol, if not the rest of the symbols during the low latency interval. One or multiple group common messages can be sent in the symbol before the low latency interval.

In another embodiment, one or multiple group common messages for the indication can be sent at the end of the latency tolerant scheduling interval. For example, if there is only one group common message configured to be sent at the end of the latency tolerant interval, it would contain xy bits where x contains the time domain information and y contains the frequency domain pre-emption information. In this example, x corresponds to time divisions and y corresponds to frequency divisions within the interval. x can be a number of symbol groups or mini-slot(s) or slots depending on the length of the eMBB scheduling interval. y can be a number of sub-bands, or RBGs or mini-slots/URLLC frequency granularity. Similarly as above, if the bandwidth is large, multiple group common messages can be sent at the end of the interval, each targeting a bandwidth partition or a sub-band. Each group common message conveys time domain information and frequency domain pre-emption information over the sub-band.

Figure 21:
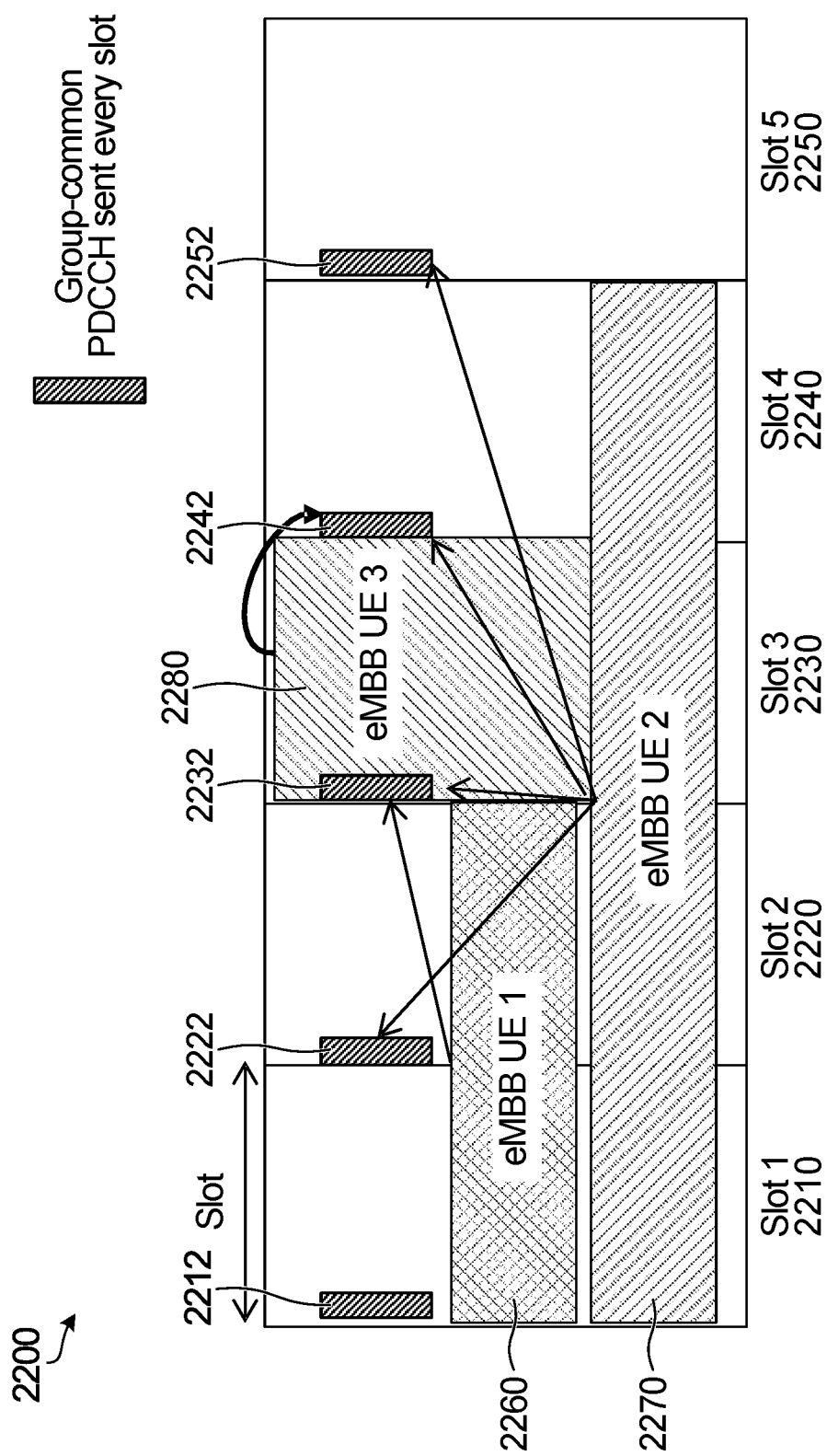
FIG. 21 illustrates another example of group common indication signaling according to an aspect of the present application.

In another embodiment, the group common indication sent in the PDCCH region of slot n provides pre-emption information of slot n−1. A latency tolerant UE that is scheduled in slot n−1 would monitor a group common PDCCH in the next slot to retrieve the indication information. FIG. 21 illustrates an example of a transmission resource including five slots, 2210, 2220, 2230, 2240, 2250, in which each slot includes a group common PDCCH 2212, 2222, 2232, 2242, 2252. A first resource allocation 2260 for a first latency tolerant UE occupies portions of slots 1 and 2, 2210, 2220. A second resource allocation 2270 for a second latency tolerant UE occupies portions of slots 1, 2, 3 and 4, 2210, 2220, 2230, 2240. A third resource allocation 2280 for a third latency tolerant UE occupies a portion of slot 3, 2230. The second latency tolerant UE monitors a group common PDCCH 2222, 2232, 2242, 2252 in slots 2 to 5, 2220, 2230, 2240, 2250 to obtain pre-emption information corresponding to slots 1 to 4, respectively. There can be one or multiple group common PDCCH sent to convey the pre-emption information. If only one group common PDCCH is sent, then all UEs monitor the common pre-emption information. For example, the group common PDCCH may have xy bits other than the cyclic redundancy check (CRC) appended to check the group RNTI, where x can be a number of symbol(s) or mini-slot(s) within the slot and y can be a number of sub-bands, RBGs or mini-slots/URLLC frequency granularity. Values of x and y are configurable. Values are chosen by higher layer and latency tolerant UEs are notified either via system information or RRC signaling what configuration is being used for the group common PDCCH.

In connection to the above example, there can be multiple group common messages sent to convey pre-emption information. The same information can be repeated over the multiple common PDCCH. Alternatively, the bandwidth can be divided into sub-bands and each common PDCCH may send pre-emption information for a sub-band. Similar to the above examples, the number of bits that can be used in each common PDCCH message is configurable.

Indication Sequence Design

Indication information sent in the control or PDCCH region can follow the same structure of a PDCCH message. The indication information can be constructed as a group of CCEs, either contiguous or non-contiguous manner. If the indication message, either UE specific or group-common, is sent during the impacted eMBB scheduling interval, it can be sent as a sequence. The indication sequence can be embedded with or without a reference signal (RS). For the option when the indication sequence is not embedded with RS, non-coherent detection can be adopted. For example, m-bit indication information is mapped to a N-bit frequency domain sequence, where N is equal or larger than m. The value of N can depend on which numerology is being used. One example of a sequence is Zadoff-Chu (ZC) sequence. A m-bit indication can convey $2^m$ different pre-emption information. N should be chosen such that given the channel dispersion or delay spread expected, $2^m$ cyclic shift of the N-point ZC sequence still remain orthogonal or almost orthogonal. For example, if m=2 and k=4 point is regarded as one shift amount, then at least $4 \times 2^2 = 16 = N$ point sequence is needed to ensure robust performance. The value of k<N depends on delay spread. For larger sub-carrier spacing, k can be small, whereas for smaller sub-carrier spacing, k can be larger. Another example of a sequence is a PN sequence. The N-point sequence can be mapped to N resource elements (REs) in one or multiple OFDM symbols. Cell specific scrambling can be performed if needed. Those N REs along with other REs carrying data of different UEs in the OFDM symbols are fed to an IFFT block and at the receiver side, the UE extracts the N-point sequence and performs a correlation check to identify which bit sequence was sent. This method of non-coherent sequence based detection can be used when the indication is sent in a time-frequency resource outside the time-frequency resource of the impacted TB, when RS cannot be used for detection. In another example, some phase rotation can be applied to the N-point indication sequence before the values of the sequence are fed to OFDM modulator. For coherent detection of the indication sent in part of the time-frequency resources used for impacted eMBB transmission, the RS used for data demodulation can also be used for indication detection. Indication bits can be processed in a similar manner as the information bits, for example, channel coding, modulation, interleaving, scrambling, etc. Even though the indication can be detected with the help of RS used for data demodulation, indication is decoded/detected separately from data. Hence, separate MCS can be used for indication message encoding and modulation. Coherent detection can also be used for group-common indication. In that case, the indication message is embedded with RS. UEs that are configured to follow the group-common indication, detect and demodulate the indication message based on the RS embedded in it.

Multi-Cell Pre-Emption

In some cases, a URLLC UE located at the edge of a serving base station region may receive interference from one or more neighboring base stations.

Figure 16:
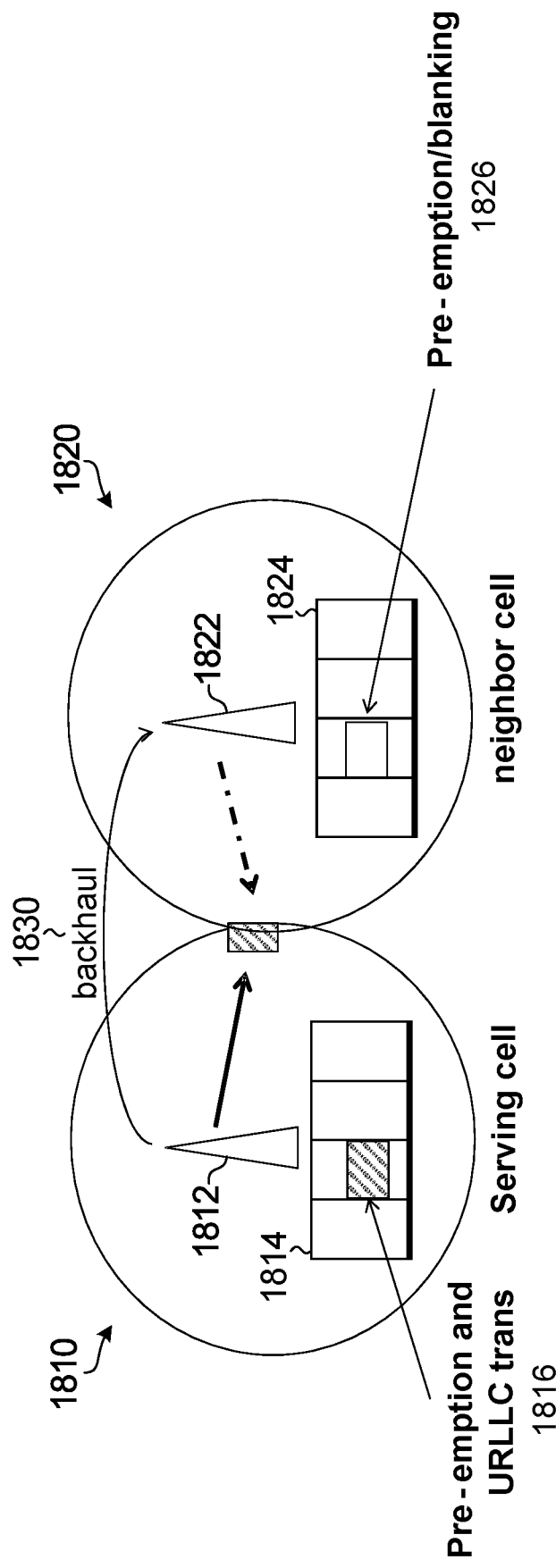
FIG. 16 illustrates an example of multi-cell pre-emption according to an aspect of the present application.

In some implementations, the serving base station can notify other neighboring base stations via backhaul that URLLC traffic will be preempting eMBB traffic in the serving base station. At a corresponding time to that of the serving base station puncturing the eMBB traffic to transmit URLLC traffic, any neighboring base stations that have been notified by the serving base stations of the URLLC traffic pre-empting the eMBB traffic can puncture a transmission resource in a corresponding scheduling interval and not transmit any traffic so as to minimize interference. FIG. 16 illustrates two adjacent communication regions: a serving communication region 1810 and a neighboring communication region 1820. Each communication region 1810, 1820 has a respective base station 1812, 1822. There is a backhaul connection 1830 between the two base stations 1812, 1822. A transmission resource 1814 with a pre-emption event and URLLC transmission 1816 is shown for the serving communication region 1810. Also shown in a transmission resource 1824 for the neighboring communication region 1820 is a pre-emption event 1826 that the base station 1822 of the neighboring cell 1820 schedules based on the information sent over backhaul.

Depending on latency tolerance, it may be beneficial that the URLLC transmission is delayed by a period of time, for example a mini-slot, to allow the serving communication region to transmit and the neighboring communication regions to receive and process the pre-emption information over the backhaul connection.

Minimizing the interference in this manner may provide higher reliability for URLLC transmission.

In another embodiment, low latency data can be shared, at least for one scheduling interval, over the backhaul with other helping/neighboring cell BS. The data, at least for one scheduling interval, is transmitted jointly by different cell BSs. It may be the case when the low latency UE is mobile and moving between the coverage areas of different base stations. Similar to a soft hand over process, the helping BS may jointly send data with the serving BS, even if the low latency UE is not associated with the helping BS. This can occur at least for one transmission, after which the UE may be associated with helping BS, which can then operate as the serving BS.

Pre-Emption Handing for MIMO Latency Tolerant Transmission

In some examples of low latency traffic pre-empting latency tolerant traffic for a latency tolerant UE, the latency tolerant traffic may be a MIMO transmission having multiple layers or streams. Therefore, the time-frequency resources of multiple layers may need to be pre-empted to accommodate the URLLC traffic.

If the indication of the pre-emption is sent during the latency tolerant scheduling, which may include transmitting a pre-emption indication at multiple locations during the interval or at a single location near the end of the interval, one or more of the following approaches can be adopted:

1) The pre-emption indication can be sent over one layer only. In some embodiments, the layer over which the pre-emption indication is sent, and thus the layer that the UE should monitor, is pre-configured. In some embodiments, the UE does not know which layer the pre-emption indication is transmitted on, so the UE blindly monitors for the indication among the various layers. In a scenario in which the indication is sent over a single layer so that multiple layers are not pre-empted for the indication, such a scenario may allow more data to be sent because less overhead needs to be used for the indication on other layers. However, when only a single layer is used to send the indication, the chosen layer may not necessarily have the best link quality of the layers that are available.

2) The pre-emption indication information is replicated over multiple layers. For simplicity and robustness, the pre-emption indication can be repeated in multiple layers. The UE can use a receive combining mechanism, for example Maximum Ratio Combining (MRC), to combine the indication received over multiple layers for decoding. If the UE receives the MIMO transmission over M layers, the UE may receive the indication over N layers where N<=M.

3) Pre-emption indication information can be divided and distributed over multiple layers. The indication can be sent over the corresponding time-frequency resources in the different layers or in different time-frequency resources in the different layers. Alternatively, the indication can be conveyed in the DCI of a next slot so that one or multiple layers are not pre-empted from sending the indication during the impacted latency tolerant interval. Various methods of communicating the pre-emption indication described above apply to MIMO based latency tolerant transmission as well.

Multiplexing of URLLC and eMBB Control Information in Uplink

As described above, a low latency TTU, for example based on a mini-slot, may pre-empt resources from a latency tolerant TTU, for example, slot based transmission. The UL control information (UCI), for example HARQ feedback, of each transmission may use time-frequency resources of an UL slot or an uplink portion of an uplink-centric slot. Embodiments are provided below for UCI resource allocation when UCI of both slot and mini-slot based traffic are sent in the same UL slot.

Similar to LTE, near each edge of the bandwidth, some frequency resources are reserved for sending UCI related information, for example PUCCH. One kind of UCI, such as long PUCCH of slot-based transmission, could span more symbols, whereas UCI of a mini-slot would span fewer symbols.

A set of PUCCH resources are configured by higher layer signaling. To facilitate PUCCH resource sharing by both mini-slot and slot based UCI, a scalable design can be used. For example, one PUCCH unit can be constructed based on K symbols, where K is less than the number of symbols in the slot, and RB or RBG granularity in frequency. Each PUCCH unit may support up to M UEs, for example by code multiplexing.

Long PUCCH can be formed using a scalable extension of basic PUCCH units. Slot level long PUCCH can aggregate more PUCCH units than a slot level short PUCCH or mini-slot PUCCH. The duration of UCI of a mini-slot can be different from DL mini-slot based transmission. For example, a DL mini-slot spans two symbols, whereas UCI of that mini-slot traffic spans four symbols.

In one embodiment, semi-static configuration can be adopted for slot level and mini-slot level UCI resources. This can be useful if there are many UEs and reserving resources would ensure no collision occurs in the configured PUCCH resources. UEs following mini-slot based transmission could send UCI in the pre-configured UCI resources for mini-slot based traffic.

In another embodiment, PUCCH resources can be dynamically shared between slot and mini-slot based traffic. The DCI of mini-slot traffic can be shifted in time, frequency, or both, to indicate which PUCCH resource/units to use. This can be useful if the network observes that a pre-configured allocation could result in a collision with other mini-slot/slot based UCI. This can also be useful when there are a lot of UEs that can be scheduled and reserving a large portion of resources may sacrifice UL data channel capacity.

In another embodiment, a combination of semi-static and dynamic sharing can be used for mini-slot and slot based UCI. For example, some symbols of a UL slot can be reserved for short PUCCH of slot-based traffic that may not be used by mini-slot traffic. Dynamic sharing may only be enabled for a portion of the configured PUCCH resources. In other words, there can be some reserved PUCCH resource sets for mini-slot and slot-based traffic and some PUCCH resource sets can be dynamically used/shared.

Mini-slot UCI can be sent as a sequence with or without RS. UCI of a mini-slot can be repeated over subsequent mini-slots, and the location can be switched for diversity.

Mini-slot DL DCI can also contain a field to indicate HARQ timing information. HARQ timing values can be configured by higher layer signaling. For dynamic UCI resource sharing, the shift that indicates the PUCCH resource set may or may not be combined with the field that signals the HARQ timing information.

If data and UCI are sent together, UCI of mini-slot can be embedded into the data region of the UL mini-slot.

Figure 17A:
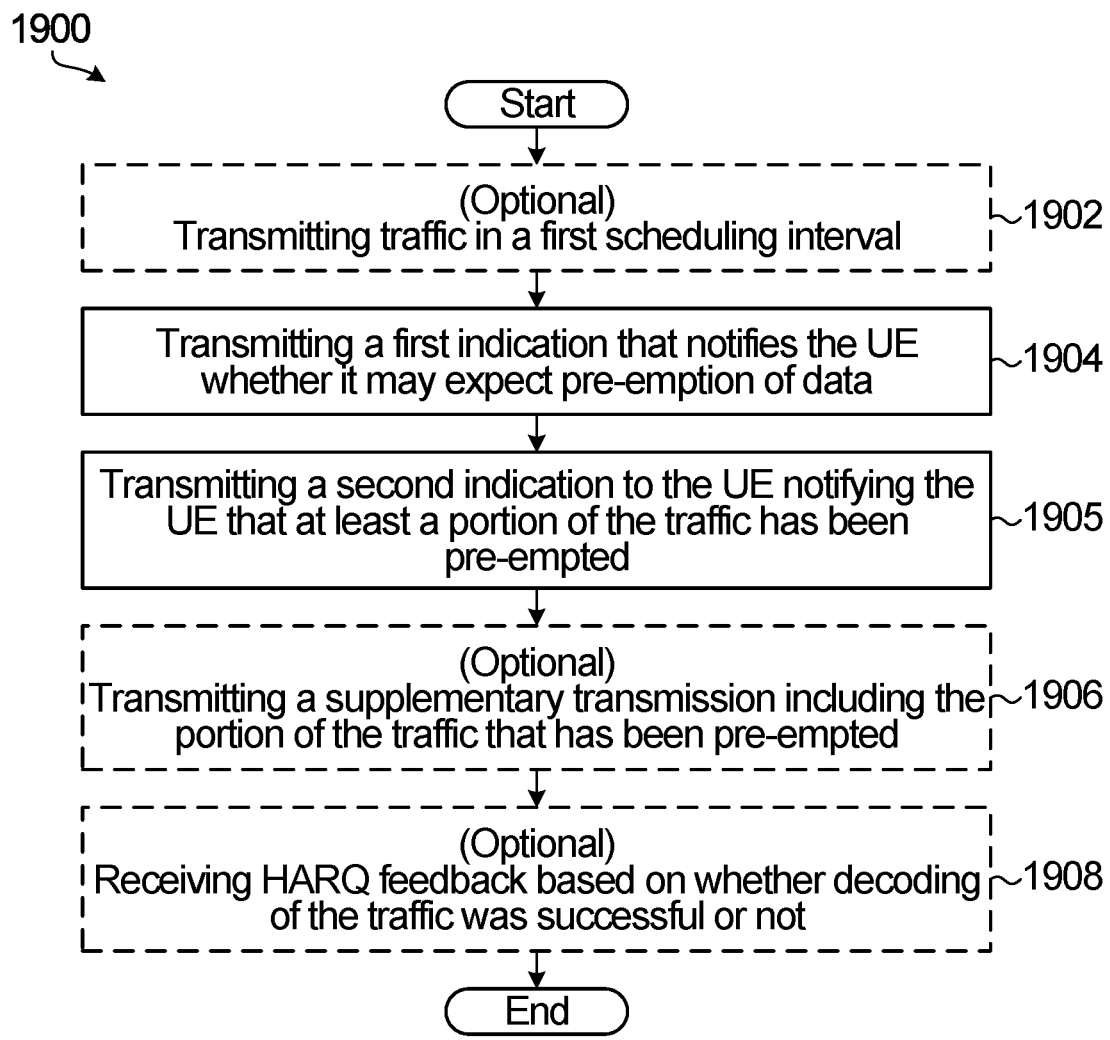
FIGS. 17A-17D illustrate methods according to aspects of the present application.

FIG. 17A is a flow chart 1900 that describes an example method. Step 1902 of the method involves an optional step of transmitting traffic in a first scheduling interval. Step 1904 of the method involves transmitting a first indication that notifies the UE whether it may expect pre-emption of data. An example of this is a notification is whether traffic for the UE is scheduled for transmission in a coexistence region of the first scheduling interval in which more than one type of traffic can be transmitted or for transmission in a region where pre-emption is prohibited by the network. Step 1905 involves transmitting a second indication to the UE notifying the UE that at least a portion of the traffic has been pre-empted. This step would not occur if the first indication indicated that the UE transmission was in a region where pre-emption was prohibited. Step 1906, an optional step, involves, transmitting a supplementary transmission including the portion of the traffic that has been pre-empted. Step 1908, an optional step, involves, receiving HARQ feedback based on whether decoding of the traffic was successful or not.

Figure 17B:
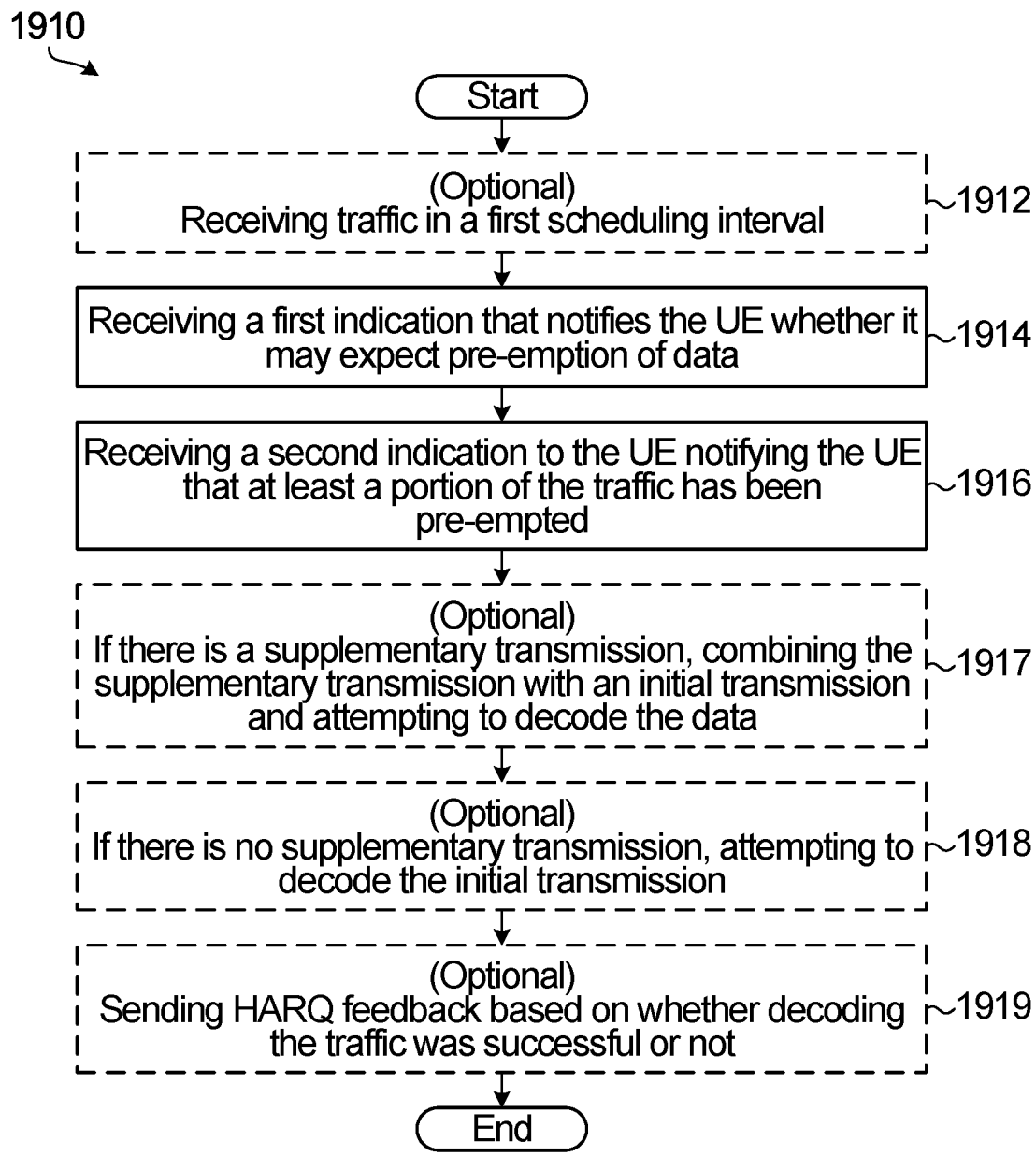

FIG. 17B is a flow chart 1910 that describes another example method from the UE perspective. Step 1912 of the method involves an optional step of receiving traffic in a first scheduling interval. Step 1914 of the method involves receiving a first indication that notifies the UE whether it may expect pre-emption of data. Step 1916 involves receiving a second indication at the UE notifying the UE that at least a portion of the traffic has been pre-empted. Step 1917, an optional step, involves, if there is a supplementary transmission, combining the supplementary transmission with an initial transmission and attempting to decode the data. Step 1918, also an optional step, involves, if there is no supplementary transmission, attempting to decode the initial transmission. A further optional step 1919 involves sending HARQ feedback based on whether decoding was successful or not in step 1917 or 1919. This would include sending an ACK if decoding was successful and a NACK if decoding was not successful. A further step, in some embodiments, may include configuring the HARQ feedback to have a longer duration if there is a supplementary transmission to allow time to receive the supplementary transmission. The first and second indications can be sent having regard to the signaling methods described in the application above.

In some embodiments, aspects of the method shown in FIGS. 17A and 17B and described above may be used together with aspects of the method described in FIGS. 17C and 17D and described below.

Figure 17C:
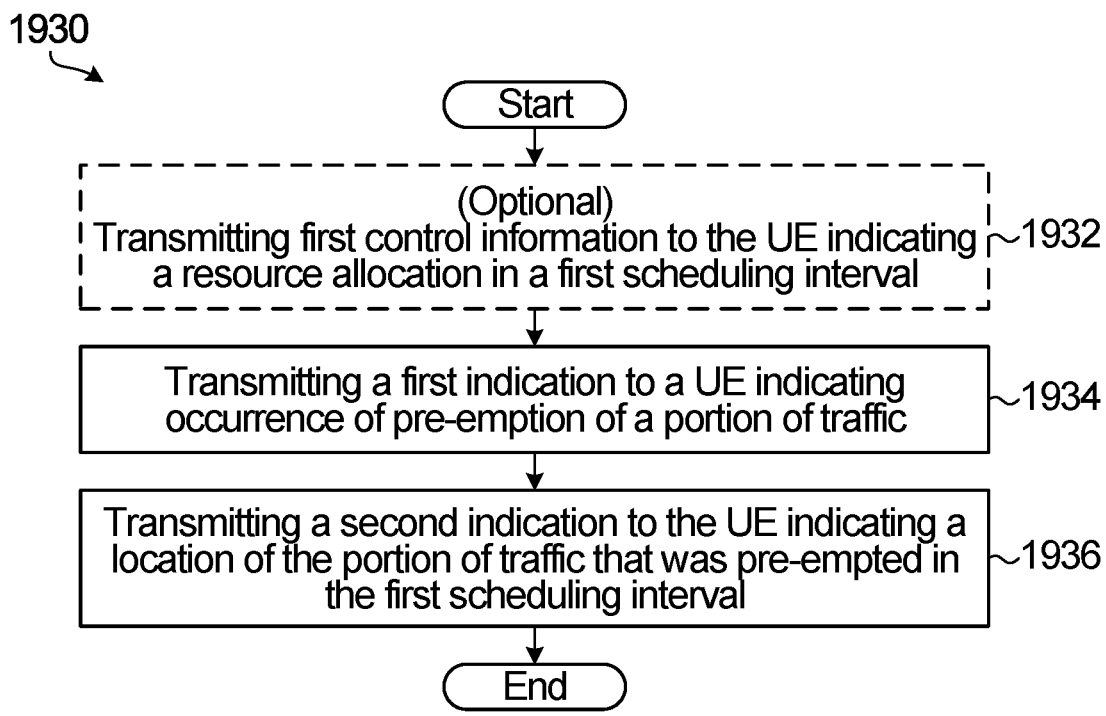

FIG. 17C is a flow chart 1930 that describes another example method. The method involves notifying a UE of pre-emption of a portion of traffic in a first scheduling interval. Step 1932 of the method involves the optional step of transmitting first control information to the UE indicating a resource allocation in a first scheduling interval. Step 1934 of the method involves transmitting a first indication to a UE indicating occurrence of pre-emption of a portion of traffic. Step 1936 of the method involves transmitting a second indication to the UE indicating a location of the portion of traffic that was pre-empted in the first scheduling interval. The first and second indications can be sent having regard to the signaling methods described in the application above.

Figure 17D:
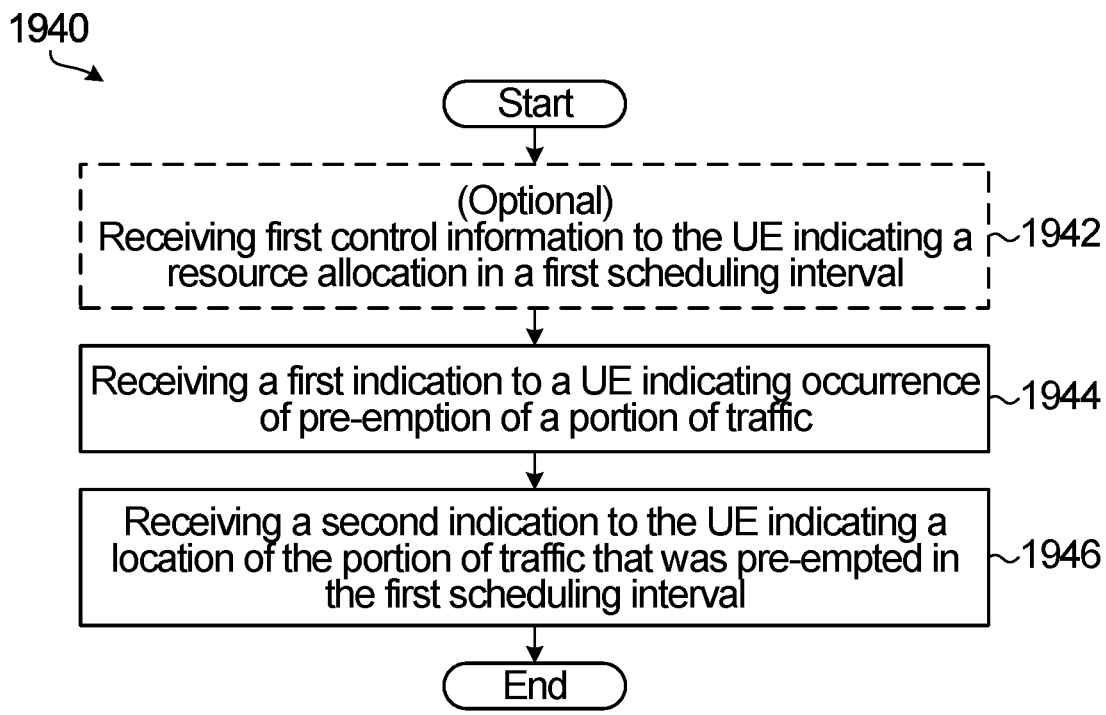

FIG. 17D is a flow chart 1940 that describes another example method. The method involves notifying a UE of pre-emption of a portion of traffic in a first scheduling interval. Step 1942 of the method involves the optional step of receiving first control information to the UE indicating a resource allocation in a first scheduling interval. Step 1944 of the method involves receiving a first indication at a UE indicating occurrence of pre-emption of a portion of traffic. Step 1946 of the method involves receiving a second indication at the UE indicating a location of the portion of traffic that was pre-empted in the first scheduling interval. The first and second indications can be received having regard to the signaling methods described in the application above.

In some embodiments, transmitting the first indication and second indication occurs in the first interval.

In some embodiments, transmitting the first indication and second indication occurs in a second scheduling interval subsequent to the first interval.

In some embodiments, transmitting the first indication comprises transmitting the first indication in a first scheduling interval and transmitting the second indication comprises transmitting the second indication in a second scheduling interval subsequent to the first interval.

In some embodiments, transmitting the first indication and second indication comprises transmitting the first and second indications in a group common control region.

In some embodiments, transmitting the first indication occurs within a UE specific region of the first scheduling interval and transmitting the second indication occurs within a common region of a second scheduling interval.

In some embodiments, transmitting the first indication and the second indication comprises transmitting the first indication and the second indication in a downlink control indication (DCI) message in scheduling interval subsequent to the first scheduling interval. In some embodiments, transmitting the first indication comprises transmitting a single bit in a UE specific portion of the DCI, the single bit indicating that a UE should monitor a common region of the DCI for additional information pertaining to at least one of the location of the portion of traffic that was pre-empted and a location of the supplementary transmission. In some embodiments, transmitting the first indication and the second indication comprises transmitting the first indication and the second indication in one or more scheduling intervals subsequent to the first interval.

Figure 18:
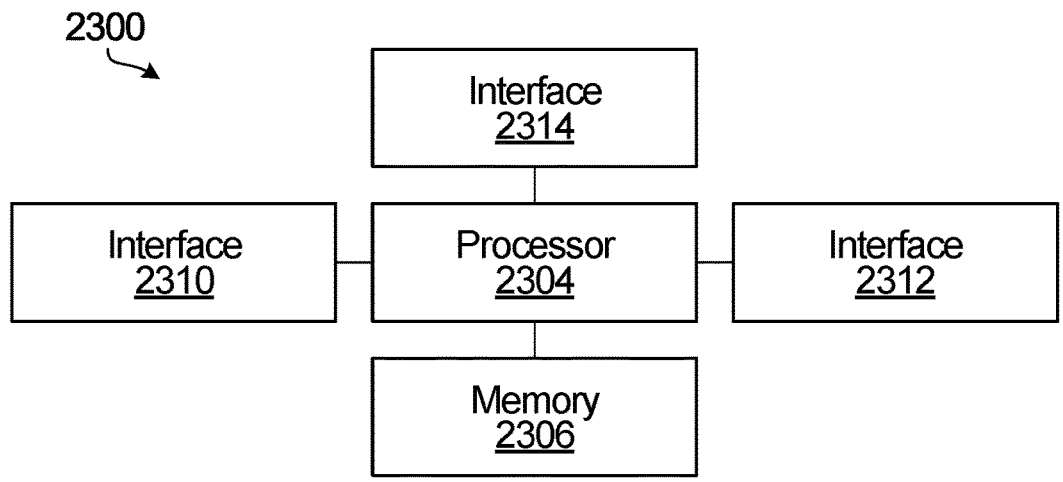
FIG. 18 illustrates a diagram of an embodiment processing system.

FIG. 18 illustrates a block diagram of an embodiment processing system 2300 for performing methods described herein, which may be installed in a host device. As shown, the processing system 2300 includes a processor 2304, a memory 2306, and interfaces 2310, 2312 and—2314, which may (or may not) be arranged as shown in FIG. 18. The processor 2304 may be any component or collection of components adapted to perform computations and/or other processing related tasks, and the memory 2306 may be any component or collection of components adapted to store programming and/or instructions for execution by the processor 2304. In an embodiment, the memory 2306 includes a non-transitory computer readable medium. The interfaces 2310, 2312, 2314 may be any component or collection of components that allow the processing system 2300 to communicate with other devices/components and/or a user. For example, one or more of the interfaces 2310, 2312, 2314 may be adapted to communicate data, control, or management messages from the processor 2304 to applications installed on the host device and/or a remote device. As another example, one or more of the interfaces 2310, 2312, 2314 may be adapted to allow a user or user device (e.g., personal computer (PC), etc.) to interact/communicate with the processing system 2300. The processing system 2300 may include additional components not depicted in FIG. 18, such as long term storage (e.g., non-volatile memory, etc.).

In some embodiments, the processing system 2300 is included in a network device that is accessing, or part otherwise of, a telecommunications network. In one example, the processing system 2300 is in a network-side device in a wireless or wireline telecommunications network, such as a base station, a relay station, a scheduler, a controller, a gateway, a router, an applications server, or any other device in the telecommunications network. In other embodiments, the processing system 2300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 2310, 2312, 2314 connects the processing system 2300 to a transceiver adapted to transmit and receive signaling over the telecommunications network.

Figure 19:
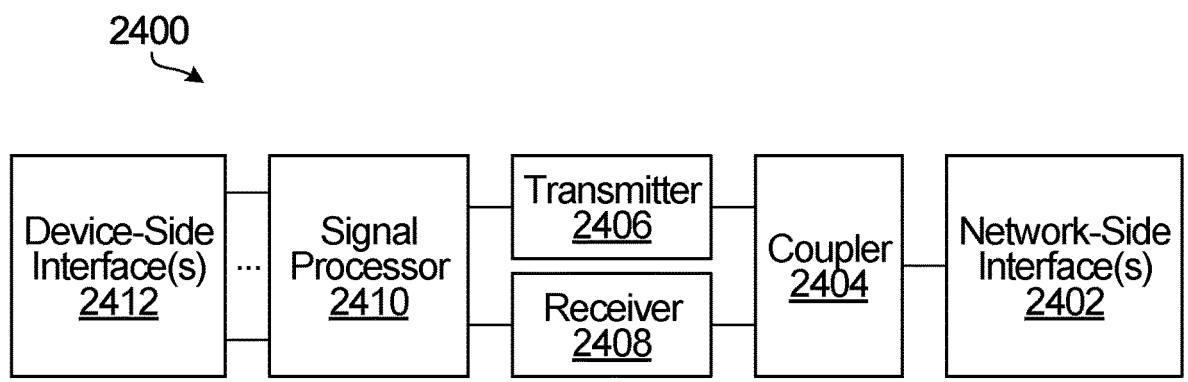
FIG. 19 illustrates a diagram of an embodiment transceiver.

FIG. 19 illustrates a block diagram of a transceiver 2400 adapted to transmit and receive signaling over a telecommunications network. The transceiver 2400 may be installed in a host device. As shown, the transceiver 2400 comprises a network-side interface 2402, a coupler 2404, a transmitter 2406, a receiver 2408, a signal processor 2410, and a device-side interface 2412. The network-side interface 2402 may include any component or collection of components adapted to transmit or receive signaling over a wireless or wireline telecommunications network. The coupler 2404 may include any component or collection of components adapted to facilitate bi-directional communication over the network-side interface 2402. The transmitter 2406 may include any component or collection of components (e.g., up-converter, power amplifier, etc.) adapted to convert a baseband signal into a modulated carrier signal suitable for transmission over the network-side interface 2402. The receiver 2408 may include any component or collection of components (e.g., down-converter, low noise amplifier, etc.) adapted to convert a carrier signal received over the network-side interface 2402 into a baseband signal. The signal processor 2410 may include any component or collection of components adapted to convert a baseband signal into a data signal suitable for communication over the device-side interface(s) 2412, or vice-versa. The device-side interface(s) 2412 may include any component or collection of components adapted to communicate data-signals between the signal processor 2410 and components within the host device (e.g., the processing system 2300, local area network (LAN) ports, etc.).

The transceiver 2400 may transmit and receive signaling over any type of communications medium. In some embodiments, the transceiver 2400 transmits and receives signaling over a wireless medium. For example, the transceiver 2400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2402 comprises one or more antenna/radiating elements. For example, the network-side interface 2402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a signaling unit or a signaling module. Other steps may be performed by an updating unit/module. The respective units/modules may be hardware, software, or a combination thereof. For instance, one or more of the units/modules may be an integrated circuit, such as field programmable gate arrays (FPGAs) or application-specific integrated circuits (ASICs).

According to a first example, there is provided a method for notifying a UE of pre-emption of a portion of traffic in a first scheduling interval, the method comprising: transmitting a first indication to the UE indicating a supplementary transmission of the portion of traffic that was pre-empted; and transmitting a second indication to the UE indicating a location of the portion of traffic that was pre-empted in the first scheduling interval.

According to an aspect of the first example, the method further comprises transmitting first control information to the UE indicating a resource allocation in the first scheduling interval.

According to an aspect of the first example, transmitting the first indication and second indication comprises transmitting the first and second indications in the first interval.

According to an aspect of the first example, transmitting the first indication and second indication comprises transmitting the first and second indications in a second scheduling interval subsequent to the first interval.

According to an aspect of the first example: transmitting the first indication comprises transmitting the first indication in a first scheduling interval; and transmitting the second indication comprises transmitting the second indication in a second scheduling interval subsequent to the first interval.

According to an aspect of the first example, transmitting the first indication and second indication comprises transmitting the first and second indications in a group common control region.

According to an aspect of the first example, the supplementary transmission occurs in a preconfigured location of the second scheduling interval.

According to an aspect of the first example, the preconfigured location is: a same relative location in the second scheduling interval as the pre-empted traffic in the first interval; or after a group common control region in the second scheduling interval.

According to an aspect of the first example, the first indication comprises a single bit per allocated transmission resource of the first scheduling interval to indicate the presence of the supplementary transmission in a second scheduling interval.

According to an aspect of the first example, the allocated transmission resource of the first scheduling interval is scheduled on one of: a slot basis; a mini-slot basis; an aggregation of slots basis; and an aggregation of mini-slots basis.

According to an aspect of the first example, when the supplementary transmission is transmitted together with another grant of traffic, the method further comprises transmitting a new data indicator (NDI) field to indicate that there is also other traffic scheduled in the second scheduling interval in addition to the supplementary transmission.

According to an aspect of the first example, the method further comprises determining the size of the supplementary transmission based on the size of the second scheduling interval and the size of the other traffic scheduled in the second scheduling interval.

According to an aspect of the first example, transmitting the first indication occurs within a UE specific region of the first scheduling interval and transmitting the second indication occurs within a common region of a second scheduling interval.

According to an aspect of the first example, the method further comprises configuring the size of the first indication based on a size of the transmission resource allocated for transmission to the UE in the first scheduling interval.

According to an aspect of the first example, transmitting the first indication and the second indication comprises transmitting the first indication and the second indication in a downlink control indication (DCI) message in scheduling interval subsequent to the first scheduling interval.

According to an aspect of the first example, transmitting the first indication comprises transmitting a single bit in a UE specific portion of the DCI, the single bit indicating that a UE should monitor a common region of the DCI for additional information pertaining to at least one of the location of the portion of traffic that was pre-empted and a location of the supplementary transmission.

According to an aspect of the first example, transmitting the first indication and the second indication comprises transmitting the first indication and the second indication in one or more scheduling intervals subsequent to the first interval.

According to an aspect of the first example, transmitting the first indication comprises transmitting the first indication in a group common downlink control channel, the group common downlink control channel comprising a field for each portion of traffic that was pre-empted to a maximum number of pre-emption events.

According to an aspect of the first example, each portion of traffic that was pre-empted is identified using a pre-emption event identifier.

According to an aspect of the first example, each field indicates a location of each portion of traffic that was pre-empted.

According to an aspect of the first example, transmitting the second indication comprises transmitting the second indication in a group common downlink control channel, the group common downlink control channel comprising a field for each UE of a set of UEs to be notified of a portion of traffic that was pre-empted.

According to an aspect of the first example, the method further comprises configuring a size of each field based on a size of granularity of allocated resources scheduled for the respective UE.

According to an aspect of the first example, transmitting the first and second indications are performed in a downlink control indication (DCI) message.

According to a second example, there is provided a method for notifying a UE of pre-emption of a portion of traffic in a first scheduling interval, the method comprising: transmitting a first indication that notifies the UE that traffic for the UE is scheduled for transmission in a coexistence region of the first scheduling interval in which more than one type of traffic can be transmitted; and transmitting a second indication to the UE notifying the UE that at least a portion of traffic has been pre-empted.

According to an aspect of the second example, the first indication instructs the UE to change a pre-configured HARQ feedback timing that defines when HARQ feedback sent by the UE.

According to an aspect of the second example, transmitting the second indication occurs within the first scheduling interval.

According to an aspect of the second example, transmitting the second indication occurs in a second scheduling interval subsequent to the first interval.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for notifying a UE of pre-emption of a portion of resources during a first interval, the method comprising:
   transmitting an indication of granularity of one or more resources within the first interval via higher layer signaling, the granularity in both time and frequency domains of the one or more resources within the first interval being configurable;
   scrambling at least part of an indication of pre-emption of the portion of resources during the first interval using a radio network temporary identifier (RNTI), the indication of pre-emption including bits that identify the one or more resources within the first interval that are preempted; and
   transmitting the indication of pre-emption, including the scrambled part, to the UE in a downlink control information (DCI) message over a physical downlink control channel (PDCCH).

2. The method of claim 1, further comprising transmitting the RNTI that is used to scramble at least part of the indication of pre-emption to the UE.

3. The method of claim 1, wherein the indication of pre-emption is transmitted during the first interval.

4. The method of claim 1, wherein the indication of pre-emption is transmitted during a second interval subsequent to the first interval.

5. The method of claim 4, wherein the indication of pre-emption indicates that no transmission, carrying the portion of resources, is communicated to the UE during a time-frequency resource in the first interval.

6. The method of claim 5, wherein the time-frequency resource is one or more of:
   at least one symbol; and
   at least one resource block.

7. The method of claim 1, wherein the indication of pre-emption is transmitted over a group common control region of the PDCCH.

8. The method of claim 1, wherein transmitting the indication of pre-emption comprises:
   transmitting the indication of pre-emption in each active bandwidth part of a carrier that includes multiple active bandwidth parts.

9. The method of claim 8, wherein a size of a transmission resource used to transmit the indication of pre-emption in each active bandwidth part contains xy bits, where x defines a number of discrete time domain elements of a particular granularity and y defines a number of discrete frequency domain resources of a particular granularity in the first interval.

10. A method for notifying a UE of pre-emption of a portion of resources in a first interval, the method comprising:
    receiving an indication of granularity of the portion of resources via higher layer signaling, the granularity in both time and frequency domains of the portion of resources being configurable;
    receiving, over a physical downlink control channel (PDCCH), a downlink control (DCI) message containing an indication of pre-emption of the portion of resources in the first interval, at least part of the indication of pre-emption being scrambled; and
    using a radio network temporary identifier (RNTI) to descramble the scrambled part of the indication of pre-emption, the indication of pre-emption including bits that identify one or more resources within the first interval that are preempted.

11. The method of claim 10, further comprising receiving an identification of the RNTI to be used to unscramble the scrambled part of the indication of pre-emption.

12. The method of claim 10, wherein the indication of pre-emption is received during a second interval subsequent to the first interval.

13. The method of claim 12, wherein the indication of pre-emption indicates that no transmission, carrying the portion of resources, is communicated to the UE during a time-frequency resource in the first interval.

14. The method of claim 13, wherein the time-frequency resource is one or more of:
    at least one symbol; and
    at least one resource block.

15. The method of claim 10, wherein the indication of pre-emption is received over a group common control region of the PDCCH.

16. The method of claim 10, wherein receiving the indication of pre-emption comprises:
receiving the indication of pre-emption in each active bandwidth part of a carrier that includes multiple bandwidth parts.

17. An apparatus comprising;
a processor;
a computer-readable media having stored thereon processor-executable instructions, that when executed by the processor, cause the apparatus to:
transmit an indication of granularity of one or more resources within the first interval via higher layer signaling, the granularity in both time and frequency domains of the one or more resources within the first interval being configurable;
scramble at least part of an indication of pre-emption of a portion of resources during a first interval using a radio network temporary identifier (RNTI), the indication of pre-emption including bits that identify the one or more resources within the first interval that are preempted; and
transmit the indication of pre-emption, including the scrambled part, to the UE in a downlink control information (DCI) message over a physical downlink control channel (PDCCH).

18. An apparatus comprising:
at least one antenna;
a processor;
a computer-readable media having stored thereon processor-executable instructions, that when executed by the processor, cause the apparatus to:
receive an indication of granularity of a portion of resources via higher layer signaling, the granularity in both time and frequency domains of the portion of resources being configurable;
receive, over a physical downlink control channel (PDCCH), a downlink control (DCI) message containing an indication of pre-emption of the portion of resources during a first interval, at least part of the indication of pre-emption being scrambled; and
use a radio network temporary identifier (RNTI) to descramble the scrambled part of the indication of pre-emption, the indication of pre-emption including bits that identify one or more resources within the first interval that are preempted.

19. The method of claim 1, wherein the bits of the indication of pre-emption identify one or more time domain resources that are preempted.

20. The method of claim 1, wherein the bits of the indication of pre-emption identify one or more frequency domain resources that are preempted.

21. The method of claim 1, wherein the bits of the indication of pre-emption identify one or more time-frequency resources that are preempted.

* * * * *